US012242119B2

(12) United States Patent
Haase

(10) Patent No.: US 12,242,119 B2
(45) Date of Patent: Mar. 4, 2025

(54) APPARATUS AND METHOD FOR MAINTAINING OPTICAL FERRULE ALIGNMENT DURING THERMAL EXPANSION OR CONTRACTION

(71) Applicant: 3M INNOVATIVE PROPERTIES COMPANY, St. Paul, MN (US)

(72) Inventor: Michael A. Haase, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/647,067

(22) Filed: Apr. 26, 2024

(65) Prior Publication Data

US 2024/0272381 A1    Aug. 15, 2024

Related U.S. Application Data

(62) Division of application No. 18/073,869, filed on Dec. 2, 2022, now Pat. No. 12,001,066, which is a division of application No. 17/250,172, filed as application No. PCT/IB2019/055443 on Jun. 27, 2019, now Pat. No. 11,543,603.

(60) Provisional application No. 62/691,980, filed on Jun. 29, 2018.

(51) Int. Cl.
*G02B 6/42*    (2006.01)
*G02B 6/38*    (2006.01)

(52) U.S. Cl.
CPC ......... *G02B 6/4226* (2013.01); *G02B 6/3826* (2013.01); *G02B 6/4214* (2013.01); *G02B 6/424* (2013.01)

(58) Field of Classification Search
CPC .............................. G02B 6/4228; G02B 6/423
See application file for complete search history.

(56) References Cited

U.S. PATENT DOCUMENTS

| | | | |
|---|---|---|---|
| 2002/0018635 | A1 | 2/2002 | Hsieh et al. |
| 2010/0034497 | A1 | 2/2010 | Glebov et al. |
| 2010/0135618 | A1 | 6/2010 | Howard et al. |
| 2011/0129181 | A1 | 6/2011 | Bolle |
| 2013/0279860 | A1 | 10/2013 | Hung et al. |
| 2014/0056591 | A1 | 2/2014 | McColloch |
| 2014/0082935 | A1 | 3/2014 | Gold et al. |

(Continued)

FOREIGN PATENT DOCUMENTS

| | | |
|---|---|---|
| JP | 2007072307 A | 3/2007 |
| JP | 2013021220 A | 1/2013 |

(Continued)

OTHER PUBLICATIONS

"Ferrule, 12F, PRIZM® LightTurn", USCONEC, URL <http://www.usconec.com/products/ferruies/piizrn-iiqhtturnferrule.html>, [retrieved on Feb. 8, 2021], 2012, p. 1.

(Continued)

*Primary Examiner* — Michael Stahl
(74) *Attorney, Agent, or Firm* — Jonathan L. Tolstedt

(57) ABSTRACT

An optical ferrule has a different thermal expansion coefficient than a substrate to which a optical device is mounted, the ferrule optically coupling the device to one or more optical fibers. The optical ferrule includes and/or a cradle in which the ferrule is mounted include lateral and longitudinal engagement feature that ensure alignment with the optical device at an operating temperature, the ferrule expanding relative to the substrate when transitioning to the operating temperature.

3 Claims, 12 Drawing Sheets

(56) References Cited

U.S. PATENT DOCUMENTS

| | | |
|---|---|---|
| 2014/0086528 A1 | 3/2014 | Yonezawa et al. |
| 2015/0260929 A1 | 9/2015 | Matsumaru et al. |
| 2016/0147026 A1 | 5/2016 | Kurtz et al. |
| 2017/0299815 A1 | 10/2017 | Sakamoto |
| 2021/0149127 A1 | 5/2021 | Kurtz et al. |

FOREIGN PATENT DOCUMENTS

| | | |
|---|---|---|
| JP | 2015079061 A | 4/2015 |
| WO | 1987001464 A1 | 3/1987 |
| WO | 2010095312 A1 | 8/2010 |
| WO | 2014055226 A1 | 4/2014 |
| WO | 2015094811 A1 | 6/2015 |
| WO | 2017066135 A1 | 4/2017 |
| WO | 2017066137 A1 | 4/2017 |
| WO | 2017082109 A1 | 5/2017 |
| WO | 2018044565 A1 | 3/2018 |
| WO | 2019175702 A1 | 9/2019 |
| WO | 2021038497 A1 | 3/2021 |

OTHER PUBLICATIONS

International Search report for PCT International Application No. PCT/IB2019/055443 mailed on Dec. 10, 2019, 3 pages.

APPARATUS AND METHOD FOR MAINTAINING OPTICAL FERRULE ALIGNMENT DURING THERMAL EXPANSION OR CONTRACTION

CROSS REFERENCE TO RELATED APPLICATION

This application is a divisional filing of U.S. application Ser. No. 18/073,869, filed Dec. 2, 2022, now allowed, which is a divisional filing of U.S. application Ser. No. 17/250,172, filed Dec. 8, 2020, issued as U.S. Pat. No. 11,543,603, which is a national stage filing under 35 C.F.R. 371 of PCT/IB2019/055443, filed Jun. 27, 2019, which claims the benefit of U.S. Provisional Application No. 62/691,980, filed Jun. 29, 2018, the disclosures of which are incorporated by reference in their entireties herein.

TECHNICAL FIELD

This disclosure relates generally to connector assemblies and methods related to connector assemblies.

BACKGROUND

Optical connectors can be used for a variety of applications including telecommunications networks, local area networks, data center links, and internal links in computer devices. Increasingly, optical functions are being incorporated in small integrated devices, such as photonic integrated circuits (PIC). A PIC device may include optical elements such as waveguides, gratings detectors, lasers, etc., that are fabricated using processes such as material deposition, photolithography, and etching. A PIC may be coupled with external optical devices via optical fibers. One challenge in utilizing a PIC in this way is efficient coupling of light between optical fibers and small-core PIC waveguides or other small-scale optical device on the PIC. Existing solutions involve active alignment of the fibers followed by permanent attachment to the devices, which is expensive, slow, and often high loss.

BRIEF SUMMARY

One embodiment is directed to an optical ferrule having an attachment area for receiving and permanently attaching to a plurality of optical fibers. A light redirecting member of the ferrule receives light, along a first direction, from a plurality of fibers received by and permanently attached to the attachment area and redirects the received light along a different second direction. The redirected light exits the ferrule at exit locations on a mating plane. The exit locations are substantially centered on a first alignment plane normal the first direction. A pair of first engagement features protrude from opposite lateral sides of the optical ferrule. The first engagement features are substantially centered on the first alignment plane. A second engagement feature, different from the pair of first engagement features, protrudes from a front side of the optical ferrule and is substantially centered on a second alignment plane perpendicular to the first alignment plane. The second alignment plane bisects the exit locations into substantially equal halves.

In some configurations, the exit locations may include a row of optical output locations along the first alignment plane. The first engagement features may include first and second tabs extending from the opposite lateral sides of the optical ferrule. The first and second tabs are located within respective first and second cavities of a cradle that secures the optical ferrule. The first and second cavities constrain the two tabs along the first direction when the optical ferrule is fit into the cradle. In such a case, the optical ferrule may further comprise first and second lateral clearances between the first and second tabs and the respective first and second cavities such that the tab can displace in a lateral direction, wherein there is little or no clearance between the first and second tabs and the respective first and second cavities in the first direction.

In other configurations, the second engagement feature may comprise a tab extending from the front side, the tab being placed in a cavity of a cradle configured to secure the ferrule. In such a case, a clearance is included between the tab and the cavity such that the tab can displace in the first direction, wherein there is little or no clearance between the first and second tabs and the respective first and second cavities in the lateral direction.

In some configuration, the optical ferrule may be formed of a polymer. The optical ferrule may further comprise a mating surface that optically interfaces with an optical device on a substrate. The optical ferrule may be configured to loosely fit into a cradle at an assembly temperature and to tightly fit into the cradle at an operating temperature. In such a case, the assembly temperature may be lower than the operating temperature.

In another embodiment, an optical ferrule, comprises an attachment end configured to receive and secure an optical waveguide. A distal tip is opposed to the attachment end along a longitudinal direction. A light redirecting element is configured to redirect light between the optical waveguide and a mating surface of the optical ferrule. A longitudinal constraint member is operable to interface with a corresponding longitudinal constraint member of a cradle that receives and secures the optical ferrule. A side-to-side constraint member is operable to interface with a corresponding side-to-side constraint member of the cradle. The longitudinal and side-to-side constraint members minimize displacement of a reference point of the optical ferrule relative to a corresponding reference point of the cradle due to different thermal expansion coefficients of the optical ferrule and the cradle causing a change in size of the optical ferrule relative to the cradle in response to a change of temperature.

In some configurations, the mating surface includes a row of optical output locations along a side-to-side line, the reference point being at a center of the side-to-side line. The longitudinal constraint member may comprise two tabs extending from opposing sides of the optical ferrule and aligned with the side-to-side line. Further, the corresponding longitudinal constraint members of the cradle may comprise two cavities that respectively constrain the two tabs longitudinally and allow side-to-side displacement of the two tabs when the optical ferrule is fit into the cradle. The side-to-side constraint member may comprise a tab extending from the distal tip aligned with the center of the side-to-side line. Further, the corresponding side-to-side constraint member may comprise a cavity that constrains side-to-side displacement of the tab and allows longitudinal displacement of the tab when the optical ferrule is fit into the cradle.

In one configuration, a first thermal coefficient of expansion of the optical ferrule is larger than a second thermal coefficient of expansion of the cradle. The optical ferrule may be formed of a polymer. The mating surface may be operable to optically interface with an optical device on a substrate, wherein the cradle aligns the optical ferrule with the optical device. The optical ferrule may be configured to loosely fit into the cradle at an assembly temperature and to tightly fit into the cradle at an operating temperature, in which case the assembly temperature may be lower than the operating temperature.

In another embodiment, a cradle is configured to receive and secure an optical ferrule. The cradle comprises a corresponding longitudinal constraint member operable to interface with a longitudinal constraint member of the optical ferrule. A corresponding side-to-side constraint member is operable to interface with a side-to-side constraint member of the optical ferrule. The longitudinal and side-to-side constraint members minimize displacement of a reference point of a mating surface of the optical ferrule with a corresponding reference point of the cradle due to a change in size of the optical ferrule relative to the cradle. The change in size is induced by different thermal expansion coefficients of the optical ferrule and the cradle and a change in temperature.

In some configurations, the mating surface may comprise a row of optical output locations along a side-to-side line, the reference point being at a center of the side-to-side line. The longitudinal constraint member of the optical ferrule may comprise two tabs extending from opposing sides of the optical ferrule and aligned with the side-to-side line. Further, the corresponding longitudinal constraint members of the cradle may comprise two cavities that respectively constrain the two tabs and allow side-to-side displacement of the two tabs when the optical ferrule is fit into the cradle. The side-to-side constraint member may comprise a tab extending from a distal tip of the optical ferrule that is aligned with the center of the side-to-side line and the corresponding side-to-side constraint member may comprise a cavity that constrains side-to-side displacement of the tab and allows longitudinal displacement of the tab when the optical ferrule is fit into the cradle.

In some configurations, a first thermal coefficient of expansion of the optical ferrule is larger than a second thermal coefficient of expansion of the cradle. The cradle is formed of a silica or other ceramic, or a low thermal expansion metal alloy such as Invar or Covar. The cradle may align and secure the optical ferrule to a substrate such that the mating surface optically interfaces with an optical device on the substrate. The optical ferrule may be configured to loosely fit into the cradle at an assembly temperature and to tightly fit into the cradle at an operating temperature, and the assembly temperature may be lower than the operating temperature.

In some configurations, the cradle may further comprise a lens configured to modify a light path between the optical ferrule and an optical device, the optical device located on a substrate to which the cradle is attached. The lens may comprise a collimating lens. The cradle may further comprise second corresponding longitudinal and side-to-side constraint members configured to minimize a second displacement of a second reference point of a second optical ferrule with a corresponding second reference point of the cradle due to a change in size of the second optical ferrule relative to the cradle.

In another embodiment, an optical assembly, comprises an optical ferrule comprising a light redirecting element configured to redirect light between an optical waveguide and a mating surface of the optical ferrule. The optical ferrule has a first thermal expansion coefficient. A cradle is configured to hold and secure the optical ferrule to a substrate. The cradle has a second thermal expansion coefficient different than the first thermal expansion coefficient. The optical ferrule is configured to fit loosely within the cradle at an assembly temperature and to expand into the cradle at an operating temperature.

In some configurations, the optical ferrule may comprise at least one constraint member and the cradle may comprise at least one corresponding constraint member. The constraint member and corresponding constraint member interface such that a displacement between a reference point of the optical ferrule and a corresponding reference point of the cradle is minimized between the assembly temperature and the operating temperature. The optical ferrule may comprise a row of optical output locations arranged in a side-to-side line along the mating surface, the reference point being at a center of the side-to-side line. The at least one constraint member may comprise a longitudinal constraint member and a side-to-side constraint member, and the at least one corresponding constraint member may comprise a corresponding longitudinal constraint member that interfaces with the longitudinal constraint member and a corresponding side-to-side constraint member that interfaces with the side-to-side longitudinal constraint member. The optical assembly may further comprise a side-to-side clearance between the longitudinal constraint member and the corresponding longitudinal constraint member such that the longitudinal constraint member can displace in a side-to-side direction, and wherein there is little or no clearance between the longitudinal constraint member and the corresponding longitudinal constraint member in a longitudinal direction.

In some configurations, the assembly temperature may be lower than the operating temperature. The optical ferrule may be formed of a polymer and the cradle may be formed of a ceramic. The optical assembly may further comprise an optical device attached to the substrate, the cradle aligning one or more optical output locations of the optical ferrule with the optical device. At least part of the one or more optical output locations may be misaligned with the optical device at the assembly temperature and the one or more optical output locations may be optimally aligned with the optical device at the operating temperature. The cradle further may comprise a lens configured to modify a light path between the optical ferrule and an optical device, the optical device located on the substrate. The lens may comprise a collimating lens. The cradle may be further configured to hold and secure a second optical ferrule to a substrate, the second optical ferrule being is located laterally to the optical ferrule. The cradle and the optical ferrule may be formed integrally.

In another embodiment, a method involves coupling an optical ferrule to a substrate via a cradle at an assembly temperature. The optical ferrule fits loosely within the cradle at the assembly temperature. The optical ferrule has a first thermal expansion coefficient and the cradle has a second thermal expansion coefficient different than the first thermal expansion coefficient. One or more devices are coupled to the substrate such that the substrate, the cradle, and the optical ferrule reach an operating temperature. A relative expansion of the optical ferrule and the cradle at the operating temperature cause the one or more output locations of the optical ferrule to be aligned with an optical device attached to the substrate.

In some configurations, the relative expansion of the optical ferrule and the cradle at the operating temperature causes the optical ferrule to fit tightly within the cradle. The method may further comprise transferring light between the optical ferrule and the optical device via the one or more output locations at a mating surface of the optical ferrule at the operating temperature. Transferring light between the optical ferrule and the optical device may comprise redirecting light between the mating surface and an optical waveguide coupled to an end of the optical ferrule. The method may further comprise minimizing a displacement between a reference point of the optical ferrule and a corresponding reference point of the cradle between the assembly temperature and the operating temperature. The displacement may be minimized via at least one longitudinal constraint member of the optical ferrule that interfaces with at least one corresponding longitudinal constraint member of the cradle and at least one side-to-side constraint member of the optical ferrule that interfaces with at least one corresponding side-to-side constraint member of the cradle.

In another embodiment, a cradle is configured to receive and secure an optical ferrule, the cradle comprises a restraining member configured to restrain the optical ferrule. Two or more bonding pads are usable with a bonding material that bonds the cradle to a substrate at a bonding temperature. The cradle has a first thermal expansion coefficient and the substrate having a second thermal expansion coefficient different than the first thermal expansion coefficient. Two or more mounting members mechanically couple the respective two or more bonding pads to the cradle. The two or more mounting members reversibly deflect in response to a force applied between the bonding pad and attachment regions of the two or more mounting members to the cradle. The force is due to the different first and second expansion coefficients.

In some configurations, the two or more mounting members may comprise two or more legs affixed near a top surface of the cradle that is opposed to the two more bonding pads. The two or more legs may comprise four or more legs each affixed at a different corner of the cradle. The two or more legs may comprise three or more legs each affixed at a different edge of the cradle. The two or more mounting members may comprise two or more hollow cylinders or hollow prisms that extend from a bottom surface of the cradle that faces the substrate. The two or more mounting members may be symmetrically arranged relative to the cradle such that the reversible deflection minimizes displacement of a reference point of the optical ferrule relative to a corresponding reference point of the substrate. The displacement may be minimized when the cradle expands or contracts relative to the substrate due to a change in temperature.

In some configurations, the cradle may further comprise a lens configured to modify a light path between the optical ferrule and an optical device, the optical device located on a substrate to which the cradle is attached. The lens may comprise a collimating lens.

In another embodiment, a cradle is configured to receive and secure an optical ferrule. The cradle comprises a restraining member configured to restrain the optical ferrule and two or more bonding pads with a bonding material that bonds the cradle to a substrate at the bonding temperature. The cradle has a first thermal expansion coefficient and the substrate has a second thermal expansion coefficient different than the first thermal expansion coefficient. Two or more mounting members mechanically couple the respective two or more bonding pads to the cradle. The two or more mounting members are deformable in response to expansions of the cradle relative to the substrate. The relative change in expansions are due to a change between a bonding temperature and an operating temperature. The two or more mounting members are deformable such that the cradle maintains an alignment between the optical ferrule and an optical device attached to the substrate at least at the operating temperature.

In some configurations, the two or more mounting members may comprise two or more legs affixed near a top surface of the cradle that is opposed to the two more bonding pads. The two or more legs may comprise four or more legs each affixed at a different corner of the cradle. The two or more legs may comprise three or more legs each affixed at a different edge of the cradle. The two or more mounting members may comprise two or more hollow cylinders or hollow prisms that extend away from a bottom surface of the cradle that faces the substrate. The two or more mounting members may be symmetrically arranged relative to the cradle such that the reversible deflection minimizes displacement of a reference point of the optical ferrule relative to a corresponding reference point of the substrate. The displacement may be minimized when the cradle expands or contracts relative to the substrate due to a change in temperature. In some configurations, the cradle may further comprise a lens configured to modify a light path between the optical ferrule and the optical device. The lens may comprise a collimating lens.

In another embodiment, method involves bonding two or more bonding pads of a cradle to a substrate at a bonding temperature. The cradle comprises two or more mounting members that mechanically couple the respective two or more bonding pads to the cradle. The cradle and substrate reach an assembly temperature. The difference between the bonding temperature and the assembly temperature causes a deformation of the mounting members due to a difference in thermal expansion coefficients between the cradle and the substrate. An optical ferrule is inserted into the cradle such that the cradle secures the optical ferrule relative to an optical device mounted on the substrate.

In some configurations, the method may further comprise activating one or more devices coupled to the substrate such that the substrate, the cradle, and the optical ferrule reach an operating temperature, wherein expansion of the cradle relative to the substrate at the operating temperature brings the optical ferrule into alignment with the optical device. The method may further comprise transferring light between the optical ferrule and the optical device via the one or more output locations at a mating surface of the optical ferrule at the operating temperature. Transferring light between the optical ferrule and the optical device may comprise redirecting light between the mating surface and an optical waveguide coupled to an end of the optical ferrule.

In another embodiment, an optical component includes an attachment area for receiving and permanently attaching a plurality of optical fibers. A light redirecting member receives light along a first direction from the plurality of optical fibers and redirects the light along a different second direction. The redirected light exits the optical component at exit locations on a mating plane. The exit locations are substantially centered on a first alignment plane normal to the first direction. Two or more bonding pads of the component are usable with a bonding material that bonds the optical component to a substrate at a bonding temperature. The optical component has a first thermal expansion coefficient and the substrate has a second thermal expansion coefficient different than the first thermal expansion coefficient. Two or more mounting members mechanically couple the respective two or more bonding pads to the optical component. The two or more mounting members reversibly deflect in response to a force applied between the bonding pad and attachment regions of the two or more mounting members to the optical component, such that the location of the intersection of the first alignment plane with the substrate is minimally affected by temperature. In one configuration, the optical component may further include a lens configured to modify a light path between the component and an optical device, the optical device located on the substrate.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
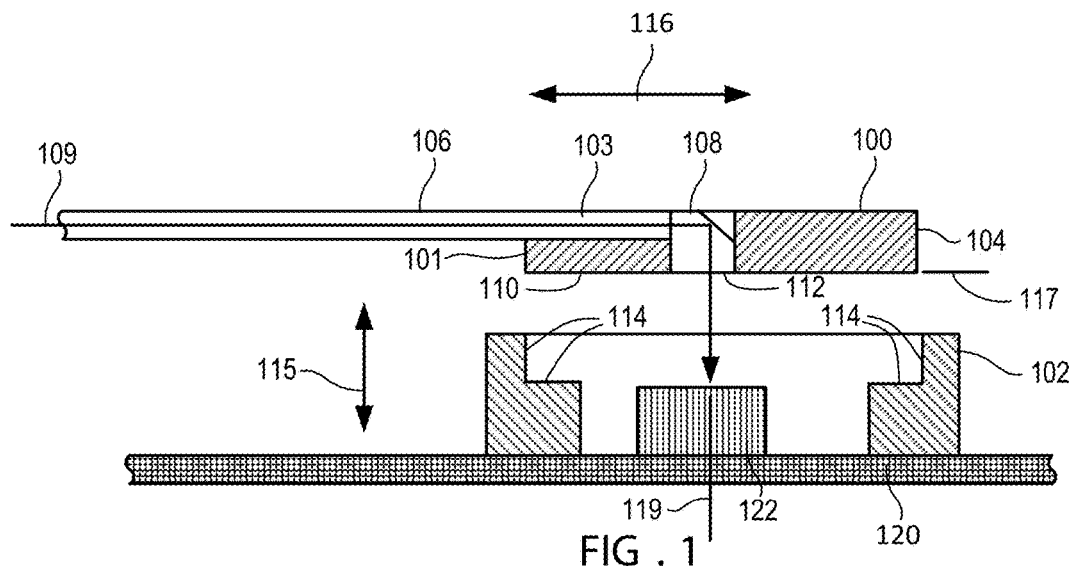
FIGS. 1, 2, and 3 are cross-sectional and top views of an optical ferrule and cradle in accordance with some embodiments.

Embodiments described herein relate to optical cable subassemblies, optical connectors, and packages for photonic integrated circuits (PICs). Connector interfaces are described that can mate one or more fiber optic waveguides to corresponding optical devices that are mounted on or integral with a substrate. In some cases, the optical device and substrate may be formed integrally as part of a PIC. In other cases, the optical device may be mounted (e.g., bonded, soldered) to a circuit board, such that the circuit board acts as a substrate. In other cases, the optical device may be mounted on an interposer or other carrier, that is in turn mounted on a circuit board. In either case, the optical devices may include waveguides, gratings, detectors, modulators, light sources (e.g., lasers) and may include other integrated optical features such as lenses, collimators, mirrors, filters, etc.

The optical connectors described below may include ferrules attached to multiple parallel waveguides (e.g., 4, 8 or 12 or more parallel waveguides). The individual waveguides are typically optical fibers made of glass (e.g., single-mode or multi-mode fibers) with a protective buffer coating, and the parallel buffered fibers are enclosed by a jacket to form a ribbon. The ferrule may include a light redirecting element that redirects light (e.g., by an angle near 90 degrees) from the optical waveguide to a mating surface where the light is directed through an output window. The optical ferrule may be configured to expand the beam that exits the mating surface, which allows for non-contact optical coupling and can relax the connector-to-connector mechanical alignment precision when compared with other types of optical connectors, such as physical contact connectors.

The optical ferrule may be made of a polymer having desirable optical properties that can be mass produced, e.g., through injection molding. An optics-grade polymer such as Zeonex K26R may have a coefficient of thermal expansion (CTE) (also referred to herein as 'thermal expansion coefficient') on the order of 63 ppm/° C. In contrast, the substrate to which the optical ferrule is mated is may be formed from a material such as a silicon which has a CTE on the order of 2.6 ppm/° C. This difference in CTE can complicate aligning the optical ferrule to a substrate-mounted or substrate-integrated optics device. For example, assembly of the optical ferrule to the substrate may occur at room temperature, but the optical device (and any other devices thermally coupled to the substrate) may cause the assembly to run at a significantly higher temperature than room temperature. The substrate and optical ferrule will expand or contract by different amounts at those different temperatures due to CTEs.

The difference in expansion between the substrate and the optical ferrule can result in the optical beams being out of alignment at some range of temperatures. Because the maximum optical coupling between the optical ferrule and optical device is needed at the operating temperature of the device, the optical ferrule is sized such that it expands to the desired size at operating temperature. At the operating temperature, the light beams entering or exiting the optical ferrule should be spaced substantially the same as elements on the device that couple to the light beams. However, the assembly of the optical ferrule, substrate, and device, will generally occur at a different temperature (e.g., a lower temperature) than the operating temperature. At this lower temperature, at least some of the optical output locations of the ferrule may be expected to be misaligned. Thus the system will have features to ensure the ferrule comes into correct alignment during operation. Further, the assembled system can be expected to cycle between operating temperatures and room temperature during service, e.g., when the optical device is powered up and down. This will result in the repeated expansion and contraction of the optical connector relative to the substrate and optical device. This may cause movement therebetween, resulting in misalignment of the light beams.

In order to ensure that an optical ferrule with different CTE than a device to which it is coupled maintains alignment even when subject to a range of temperatures, two approaches are described below. In both approaches, a cradle is used that receives the optical ferrule and secures it to the substrate. In one approach, the cradle is made of a material with CTE similar to that of the substrate. The cradle and optical ferrule include features that ensure the ferrule aligns with the substrate at an operating temperature range. In another approach, the cradle and ferrule are made of similar-CTE materials. In this approach, the cradle will be tightly attached to the ferrule over a wide range of temperatures. The cradle, which will expand differently than the substrate, includes features that ensure the cradle aligns with the substrate at operating temperature, which will in turn align the ferrule.

Figure 2:
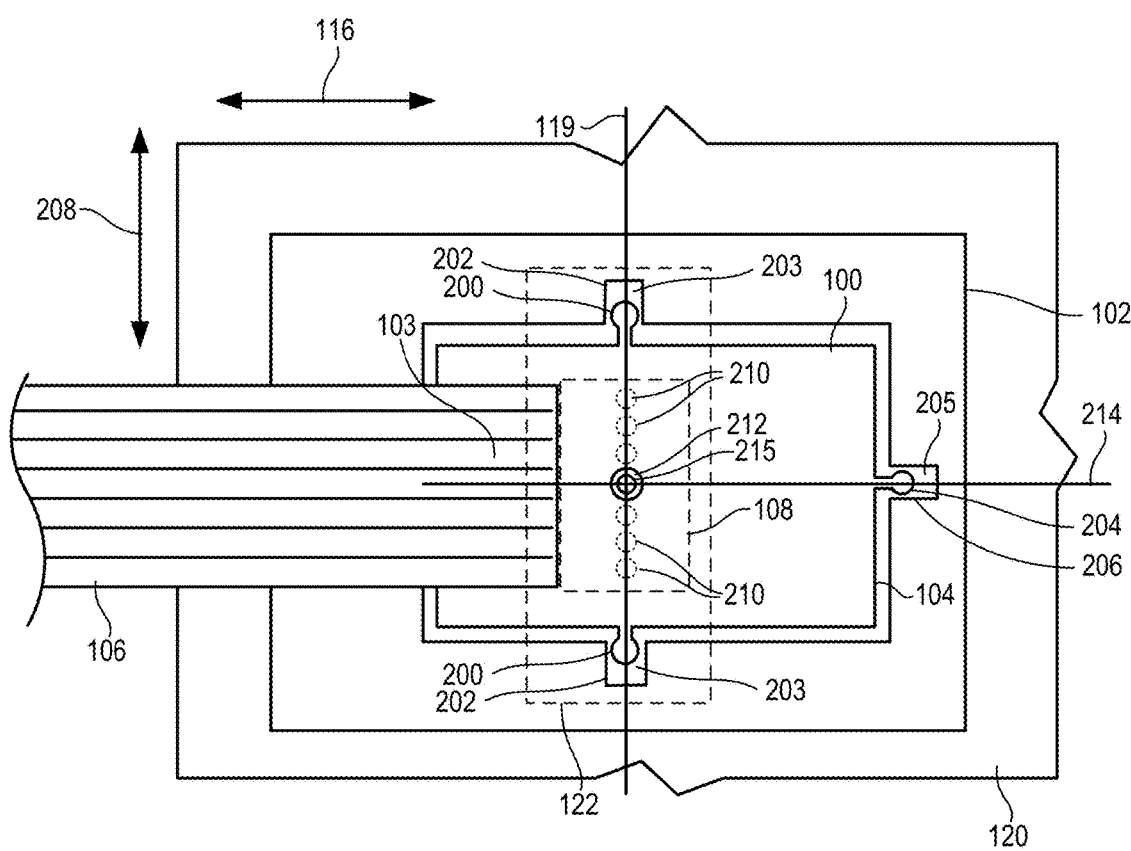

In FIGS. 1 and 2, simplified diagrams illustrate side and cross-sectional views of an optical ferrule 100 and cradle 102 according to an example embodiment. In this embodiment, the optical ferrule 100 and cradle 102 are made of materials with different CTE. In this specific example, it is assumed that the thermal expansion coefficient of the ferrule is higher than that of the cradle. The optical ferrule 100 includes an attachment end 101 configured to receive and secure an optical waveguide 106 (in this example, a plurality of optical fibers as seen in FIG. 2). The interface between the waveguides 106 and the ferrule 100 is generally referred to as an attachment area 103 that receives and permanently attaches the plurality of optical fibers 106. A distal tip 104 of the optical ferrule 100 is opposed to the attachment end 101 along a longitudinal direction 116. Note that in this and other embodiments, the term "longitudinal" generally relates to the orientation of the elongated waveguides/fibers 106 at the attachment end 101, and is not meant to be limiting as to the relative shape or dimensions of the optical ferrule 100.

The optical ferrule 100 includes a light redirecting member 108 that receives light 109 along a first direction (the longitudinal direction 116) from the plurality of fibers 106. The light redirecting member 108 redirects the received light along a different, second, direction 115, which in this example is normal to a substrate 120 to which the cradle 102 is attached. Note that the light redirecting member 108 may work in the other way, receiving light in direction 115 and sending it through the fibers 106 along direction 116. It will be understood that any description herein of light exiting or output from a ferrule is equally applicable to light entering or being input to the ferrule, and such terms are not meant to limit how the ferrule and optical device may interact.

As best seen in FIG. 2, the redirected light 109 exits the optical ferrule at exit locations on a mating plane 117 (see exit locations 210 in FIG. 2, also referred to herein as optical output-locations). This mating plane 117 corresponds to a mating surface 110 of the ferrule 100 in this example. The optical exit locations 210 are substantially centered on an alignment plane 119 normal to the first direction 116.

In FIG. 1, the ferrule 100 is shown separated from the cradle 102. The cradle 102 is configured to receive and secure the optical ferrule 100 as the ferrule 100 is moved downward in first direction 116. For example, the cradle 102 may include surfaces 114 onto or next to which the ferrule 100 is placed and is at least partially constrained. Additional constraints may be provided by a cap (not shown) that traps the ferrule 100 into the cradle 102.

Generally, at an assembly temperature, the ferrule 100 can fit loosely within the cradle 102, e.g., such that minimal force is needed to insert the ferrule 100 within the cradle 102. At the operating temperature, the ferrule 100 will have expanded more than the cradle 102, resulting in a tight fit. The tight fit at the operating temperature is at least such that deflections caused by external forces, e.g., forces acting on the optical waveguides 106, will not cause excessive optical misalignment of beams coupled between the ferrule 100 and an optical device 122. The tight fit may involve contact or interference between at least part of the ferrule 100 and cradle 102, but may also have some gaps therebetween in at least some regions. The cradle 102 is made from a material such a ceramic (e.g., silica) or metal alloy that has a similar CTE as the substrate 120, and so there will be minimal relative expansion therebetween due to the same temperature changes.

In FIG. 2, the optical ferrule 100 and cradle 102 are shown in the loose-fitting configuration, e.g., at the assembly temperature. Also seen in this view is a longitudinal constraint member 200 operable to interface with a corresponding longitudinal constraint member 202 of the cradle 102. In this example, the longitudinal constraint member 200 is configured as a pair of first engagement features (e.g., tabs) protruding from opposite lateral sides of the optical ferrule 100 in a side-to-side direction 208. The engagement features 200 are substantially centered on the alignment plane 119. The corresponding longitudinal constraint member 202 is configured in this example as a pair of cavities that encompass the engagement features 200. Note the side-to-side clearances 203 between the longitudinal constraint member 200 and the corresponding longitudinal constraint members 202 such that the longitudinal constraint member 200 can displace in the side-to-side direction 208 (e.g., due to expansion of the ferrule 100), however there is little or no clearance therebetween in the longitudinal direction 116.

The optical ferrule 100 includes a side-to-side constraint member 204 operable to interface with a corresponding side-to-side constraint member 206 of the cradle 202. In this example, the side-to-side constraint member 204 is configured as a second engagement feature, different from the pair of first engagement features 200, protruding from a front side (distal end 104) of the optical ferrule 100. A second alignment plane 214 passes through the second engagement feature 204 and is perpendicular to the alignment plane 119 and substantially bisects exit locations 210 into substantially equal halves. A longitudinal clearance 205 between longitudinal constraint member 200 and the corresponding longitudinal constraint member 204 is such that the longitudinal constraint member 200 can displace in the longitudinal direction 116 (e.g., due to expansion of the ferrule 100), however there is little or no clearance therebetween in the side-to-side direction 208.

The exit locations 210 are a feature of the ferrule 100, e.g., geometric locations defined by the shape and location of the light redirecting member and correspond to locations of light beams coupled into or out of the ferrule 100. In this view (at the assembly temperature) the pitch of the exit locations 210 will be different than those of corresponding optical features (not shown) of the optical device 122. The pitch of exit locations 210 will approximately equal that of the corresponding optical features of the optical device 122 at the operating temperature.

Figure 3:
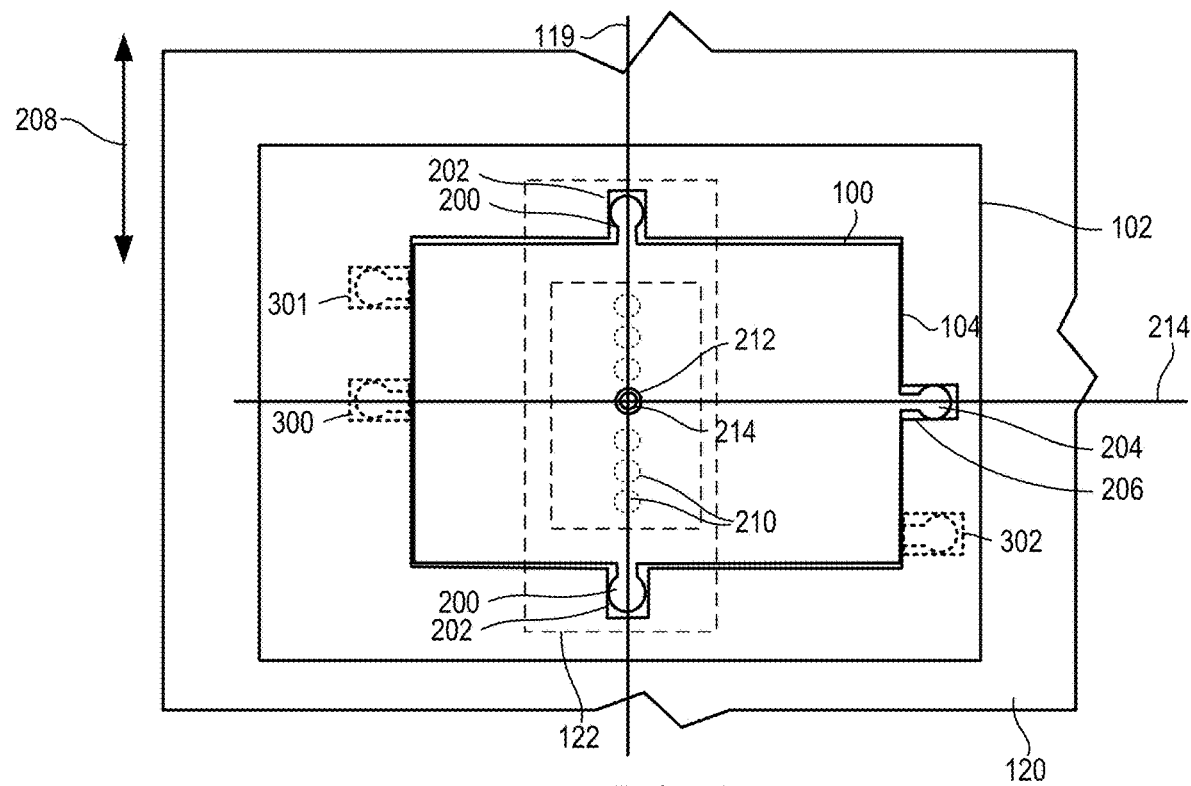

The longitudinal and side-to-side constraint members 200, 204 are configured to align the exit locations 210 with the corresponding optical features of the optical device 122 at the operating temperature. This can be done by minimizing displacement of a reference point 212 of the optical ferrule 100 relative to a corresponding reference point 215 of the cradle 102 due to a change in size of the optical ferrule 100 relative to the cradle 102 caused by a change of temperature. In FIG. 3, the optical ferrule 100 is shown in the cradle 102 at or near and operating temperature. The optical ferrule 100 has expanded more than the cradle 102 due to its larger CTE, such that the ferrule 100 now fits tightly within the cradle 102, e.g., fills the cavity within the cradle 102. Due to the arrangement of the constraint members 200, 204 relative to the planes 119, 214, displacement between reference points 212, 215 is minimized, resulting in the exit locations 210 being substantially aligned with the optical device 122. The exit locations 210 have expanded in the side-to-side direction 208 such that a pitch of the exit locations 210 also matches that of the optical device 122.

Figure 4:
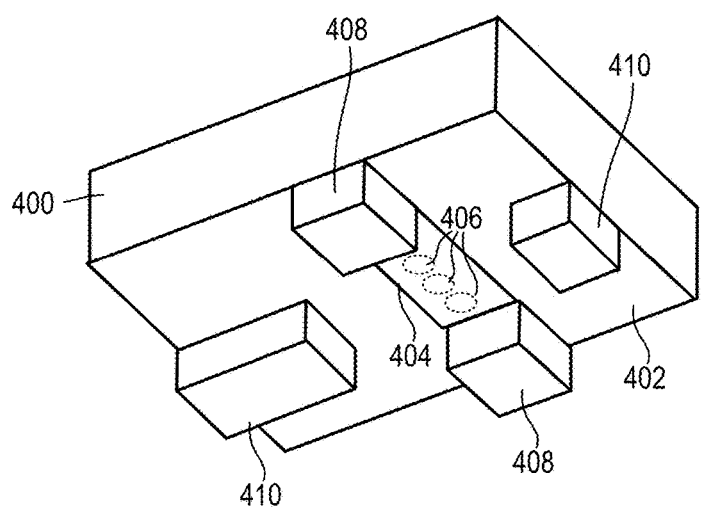
FIG. 4 is a perspective view of an optical ferrule according to an example embodiment.

Note that more than the indicated constraint members may be used. As indicated by the dashed box 300, an additional side-to-side constraint may supplement 204 and 206. Alternatively, as indicated by the dashed boxes 301 and 302, other side-to-side constraint members may be used instead of to side-to-side constraint member 204 and 206. Similar longitudinal restraint members may be used as well. In some configurations, constraint members may be located elsewhere or in addition to sides of the ferrule. This is seen in the example embodiment shown in the perspective view of FIG. 4. In this view, a mating surface 402 of the ferrule 400 is seen, as is an exit window 404 in which can be seen optical input/output locations 406. A longitudinal constraint member includes ridges 408 and a side-to-side constraint member includes ridges 410. A cradle (not shown) would include corresponding channels into which the ridges 408, 410 would fit. Any combination of ridges 408, 410 shown in FIG. 4 and tabs 202, 204 shown in FIG. 2 may be used in other embodiments.

Note that in the above embodiments it was assumed that the CTE of the optical ferrule is greater than that of the cradle and substrate, and that the assembly temperature is less than the operating temperature. However, in this and other embodiments, a system with inverse characteristics (CTE of the optical ferrule is less than that of the cradle and substrate, and that the assembly temperature is greater than that of the operating temperature) may also achieve a similar result, with a tight fit between the cradle and ferrule at operating temperature and a loose fit therebetween at assembly temperature by providing constraint members in the cradle that fit into cavities in the ferrule.

Figure 5:
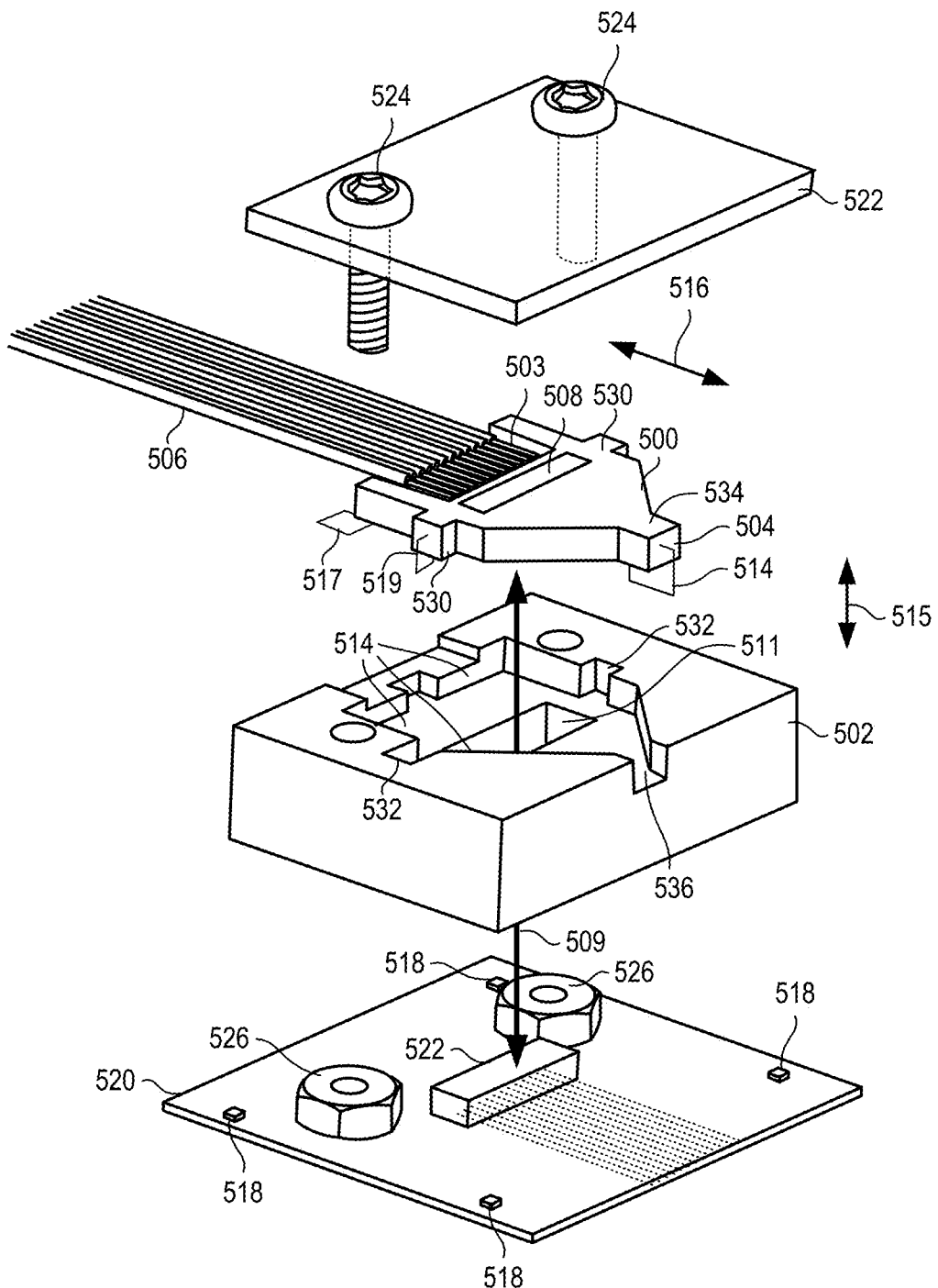
FIG. 5 is a perspective, exploded, view of an optical connector system according to an example embodiment.

In FIG. 5, a perspective exploded view shows an optical connecting arrangement according to another example embodiment. An optical ferrule 500 and cradle 502 are made of materials with different CTE. The optical ferrule 500 includes an attachment area 503 that receives and permanently attaches an optical fiber ribbon 506. A distal tip 504 of the optical ferrule 500 is opposed to the attachment area 503 along a longitudinal direction 516. The ferrule 500 includes a light redirecting member 508 that redirects light 509 between the optical fiber ribbon 506 in direction 516 and an optical device 522 in direction 515, which is normal to a substrate 520 to which the cradle 502 is attached. In other embodiments, the redirected direction 515 may be non-normal to the substrate. The redirected light 509 exits and enters the optical ferrule 500 at exit locations (not shown) on a mating plane 517, which corresponds to a mating surface (not shown) of the ferrule 500. The optical exit locations are substantially centered on an alignment plane 519 normal to the first direction 516. Antireflection coatings may be used to reduce reflections of light entering or exiting the ferrule. Note that the cradle 502 includes a void 511 which facilitates passing the light 509 between the ferrule 500 and optical device 522.

In FIG. 5, the ferrule 500 is shown separated from the cradle 502. The cradle 502 is configured to receive and secure the optical ferrule 500 as the ferrule 500 is moved downward in first direction 515. For example, the cradle 502 includes surfaces 514 onto or next to which the ferrule 100 is placed and is at least partially constrained. Additional constraints may be provided by a cover 522 that traps the ferrule 500 into the cradle 502. The illustrated cover 522 is held in place by screws 524 that fasten to nuts 526. Note that other attachment means such as clips or bonding may be used to secure the cover 522 to the cradle 502 and substrate 520.

Figure 6:
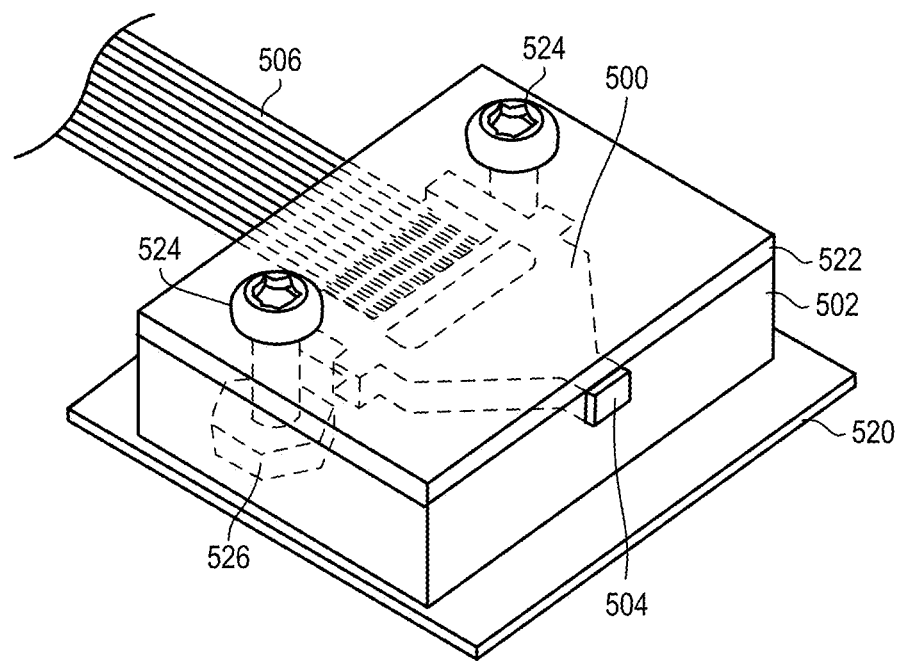
FIGS. 6 and 7 are perspective and top views of the optical connector system of FIG. 5.

The cradle 502 may be permanently attached to the substrate 520 before assembly of the ferrule 500 with the cradle 502. As indicated by pads 518, this attachment may include soldering or other types of bonding. In the case of solder bonding, the pads would be metal wetted by the solder. The cradle 502 can be precisely placed over the optical device 522, e.g., via a pick and place machine, and then secured to the substrate 520 through the application of heat, light cure adhesives, etc. Thereafter, the cradle 502 and substrate 520 form a subassembly to which the ferrule 500 and fiber optic ribbon 506 may be attached, e.g., at room temperature manually or via a robotic device. The final assembly, which includes attachment of the cover 522, can be seen in the perspective view of FIG. 6. Note that, as seen in FIG. 6, the distal tip 514 extends outside the cradle 502. The tip 514 corresponds to a molding gate in this design, so by having the tip 514 extend outside the cradle 502, any degating vestige does not affect alignment.

Figure 7:
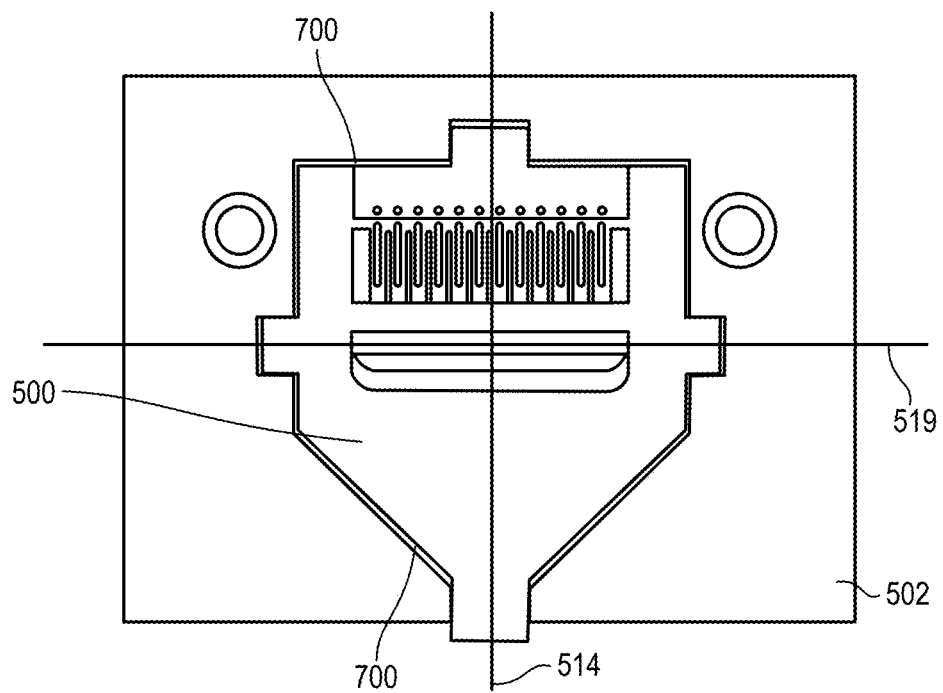

Generally, at an assembly temperature, the ferrule 500 can fit loosely within the cradle 502 such that minimal force is needed to insert the ferrule 500 within the cradle 502. This is seen in the top view of FIG. 7, where gaps 700 can be seen between the outline of the ferrule 500 and the receiving cavity of the cradle 502. At an operating temperature higher than the assembly temperature, the ferrule 500 will have expanded more than the cradle 502, resulting in a tight fit, e.g., an interference fit.

In reference again to FIG. 5, a longitudinal constraint member (tabs 530) of the ferrule 500 is operable to interface with a corresponding longitudinal constraint member (cavities 532) of the cradle 502. The engagement tabs 530 are substantially centered on an alignment plane 519, which defines a center of the optical output locations in direction 526. The optical ferrule 100 includes a side-to-side constraint member (tab 534) operable to interface with a corresponding side-to-side constraint member (cavity 536) of the cradle 202. A plane 514 passes through the side-to-side constraint member 534 and is perpendicular to the alignment plane 519 and substantially bisects the exit/entrance locations of the light redirection member 508 into substantially equal halves.

Figure 20:
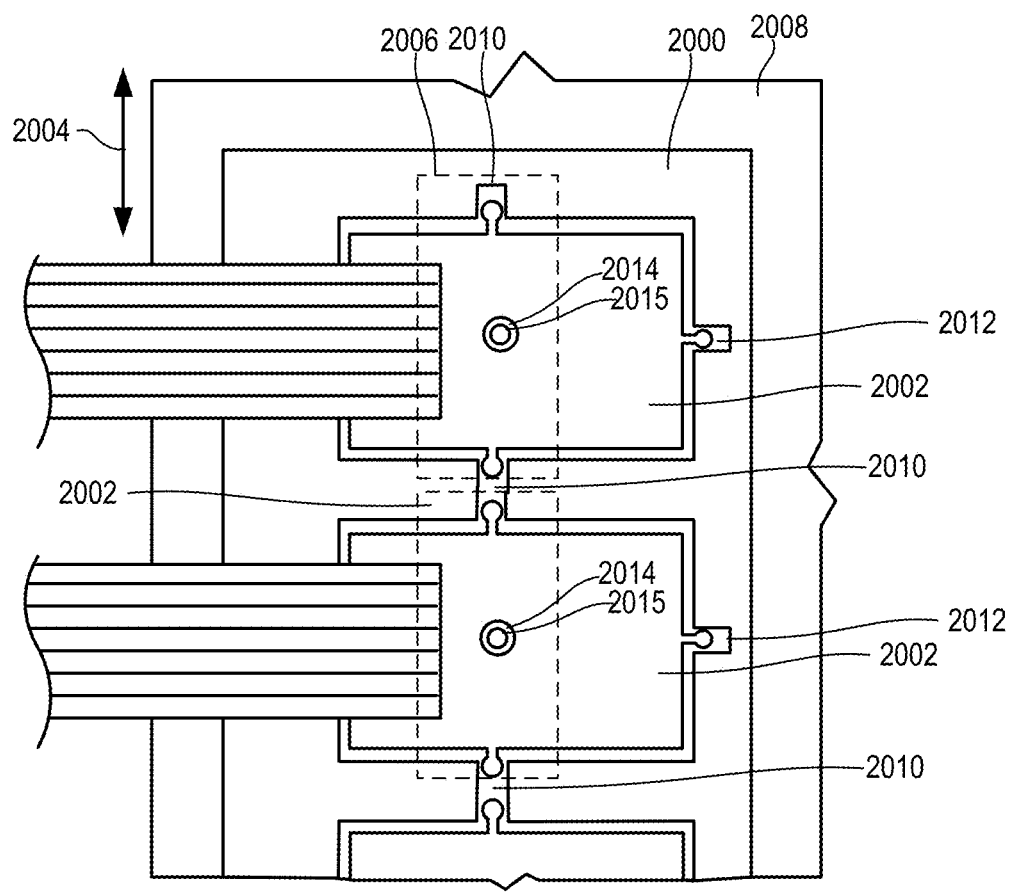
FIG. 20 is a top view of multiple optical ferrules and a cradle in accordance with some embodiments.

In another example embodiment shown in FIG. 20, a cradle 2002 is configured to receive and secure two or more ferrules 2000. The ferrules 2000 may include features similar to those previously described, e.g., ferrule 100 in FIG. 1. The ferrules 2000 and cradle 2002 have different CTEs. The ferrules 2000 are offset from one another and are configured to optically couple to devices 2006 on substrate 2008. The cradle 2002 may be made of materials previously described above (e.g., ceramics, silica) and maintains alignment between the ferrules 2000 and the devices 2006 in a transition from an assembly temperature to an operating temperature. The cradle 2006 includes multiple corresponding longitudinal 2010 and side-to-side 2012 constraint members configured to minimize multiple displacements between multiple reference points 2014 of the multiple optical ferrules 2000 with multiple second reference points 2015 of the cradle 2006 due to a change in size of the multiple optical ferrules 2000 relative to the cradle 2002.

Figure 8:
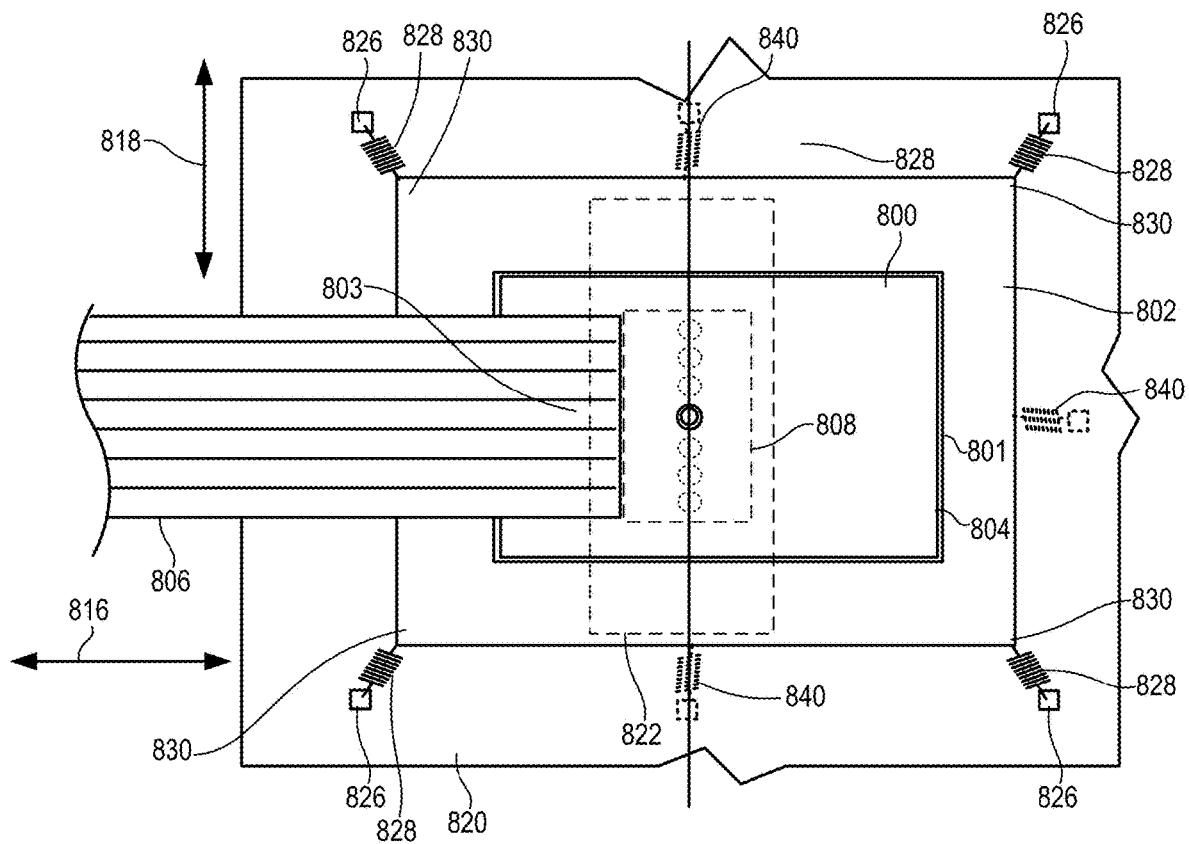
FIGS. 8 and 9 are top views of an optical ferule and cradle in accordance with other embodiments.

In FIG. 8, a top view shows an optical ferrule 800 and cradle 802 according to other example embodiments. In this example, the optical ferrule 800 and cradle 802 have the same or similar CTE, and these CTE are different than a CTE of a substrate 820 and optical device 822 to which the ferrule 800 is mated. The optical ferrule 800 includes a light redirection member 808 and an attachment area 803 that receives and permanently attaches an optical fiber ribbon 806. A distal tip 804 of the optical ferrule 800 is opposed to the attachment area 803 along a longitudinal direction 816.

Because the optical ferrule 800 and cradle 802 have same or similar CTE, they can have a relatively tight fit at the assembly temperature. The components may be configured with a restraining member 801 such that assembly and disassembly of the optical ferrule 800 and cradle 802 can be done by hand, e.g., without significant installation forces, yet still having features such as snaps, springs, etc., that ensure a tight fit to restrain the ferrule 800. In this example, the restraining member 801 includes at least a perimeter surface of a cavity of the cradle 802, the shape of the perimeter surface matching the top view outline of the ferrule 800. There may be small gaps between the restraining member 801 surfaces and lateral surfaces of the ferrule 800 to aid in assembly of the ferrule. Other components, such as a cover may also restrain the ferrule 800 after it is placed in the cradle 802. In other embodiments, the ferrule 800 may be formed integrally with the cradle 802, e.g., molded as one piece.

Before assembly of the optical ferrule 800 to the cradle 802 (if the components are formed separately), the cradle 802 will be attached to the substrate 820. This may involve a high temperature process such as soldering. Thus the cradle includes two or more bonding pads 826 usable with a bonding material (e.g., solder) that bonds the cradle to a substrate at a bonding temperature. The bonding pads 826 represent attachment points between the cradle 802 and the substrate 820, and the substrate 820 may have similar pads (not shown). This bonding temperature is different than the assembly temperature (temperature when the ferrule 800 is inserted into the cradle 802), and may also be different (e.g., higher than) the operating temperature of the assembly. Because these temperature differentials will result in greater dimensional change in the cradle 802 than in the substrate 820, the cradle 802 includes two or more mounting members 828 with controlled compliance that mechanically couple the respective two or more bonding pads 826 to the cradle 802.

In this diagram, the two or more mounting members 828 are schematically represented as springs at the corners of the cradle 802. The two or more mounting members 828 reversibly deflect in response to a force applied between the bonding pad 826 and attachment regions 830 of the two or more mounting members 828 to the cradle 802. Generally, these forces are due to the different expansion coefficients of the cradle 802 and substrate 820, but may also be due to other forces, e.g., forces acting on the optical fibers 806. The stiffness of the mounting members 828 can be selected so that they are sufficiently rigid to prevent excessive movement in response to expected forces in use, while sufficiently flexible to allow the cradle 802 to shrink and grow relative to the substrate 820 without breakage or other damage.

Figure 9:
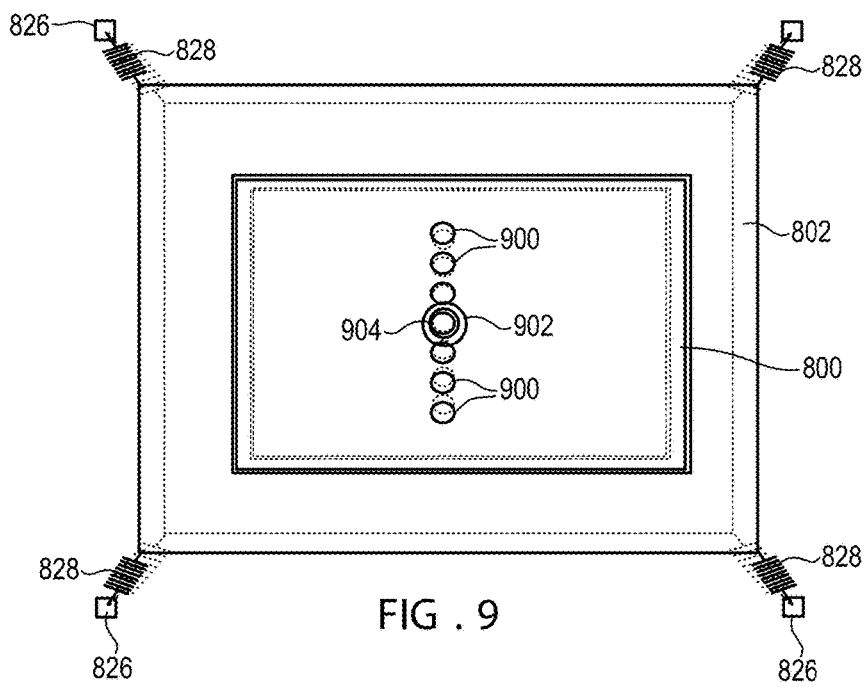

The mounting members 828 are configured such that forces acting on the cradle 802 via the mounting members 828 due to thermal expansion or contraction of the cradle 802 relative to the substrate minimizes a misalignment between the cradle 802 and the optical device 822 in at least one region. An example of this is shown in the simplified view of FIG. 9. The cradle 802 and ferrule 800 are shown in an expanded configuration (e.g., at the bonding temperature) using solid lines, and shown in a contracted configuration (e.g., at the assembly temperature) using dashed lines. Note that the ferrule 800 would not typically be located in the cradle 802 during bonding, but is shown to illustrate the effects that expansion/contraction of the cradle 802 will have on alignment of the ferrule 800 with the optical device 822. A similar expansion/contraction may occur between the assembly temperature and the operating temperature, and the ferrule 800 would be located in the cradle 802 in that case. As indicated by dashed shapes 840, the mounting members and associated pads may include three or more mounting members each affixed at a different edge of the cradle 802.

A row of optical output locations 900 associated with the ferrule 800 are shown in both the expanded and contracted configurations. These output locations 900 will align with optical features (e.g., facets, lenses, waveguides, detectors) of the optical device. In order to minimize the net displacement of these output locations 900 during operation, the mounting members 828 minimize a misalignment between a reference point of the cradle 802 and a corresponding reference point of the optical device 822 and/or substrate 820 when the cradle 802 expands or contracts due to temperature changes. In this figure, the centers of circles 902, 904 will define the reference point and corresponding reference point in this example.

Figure 10:
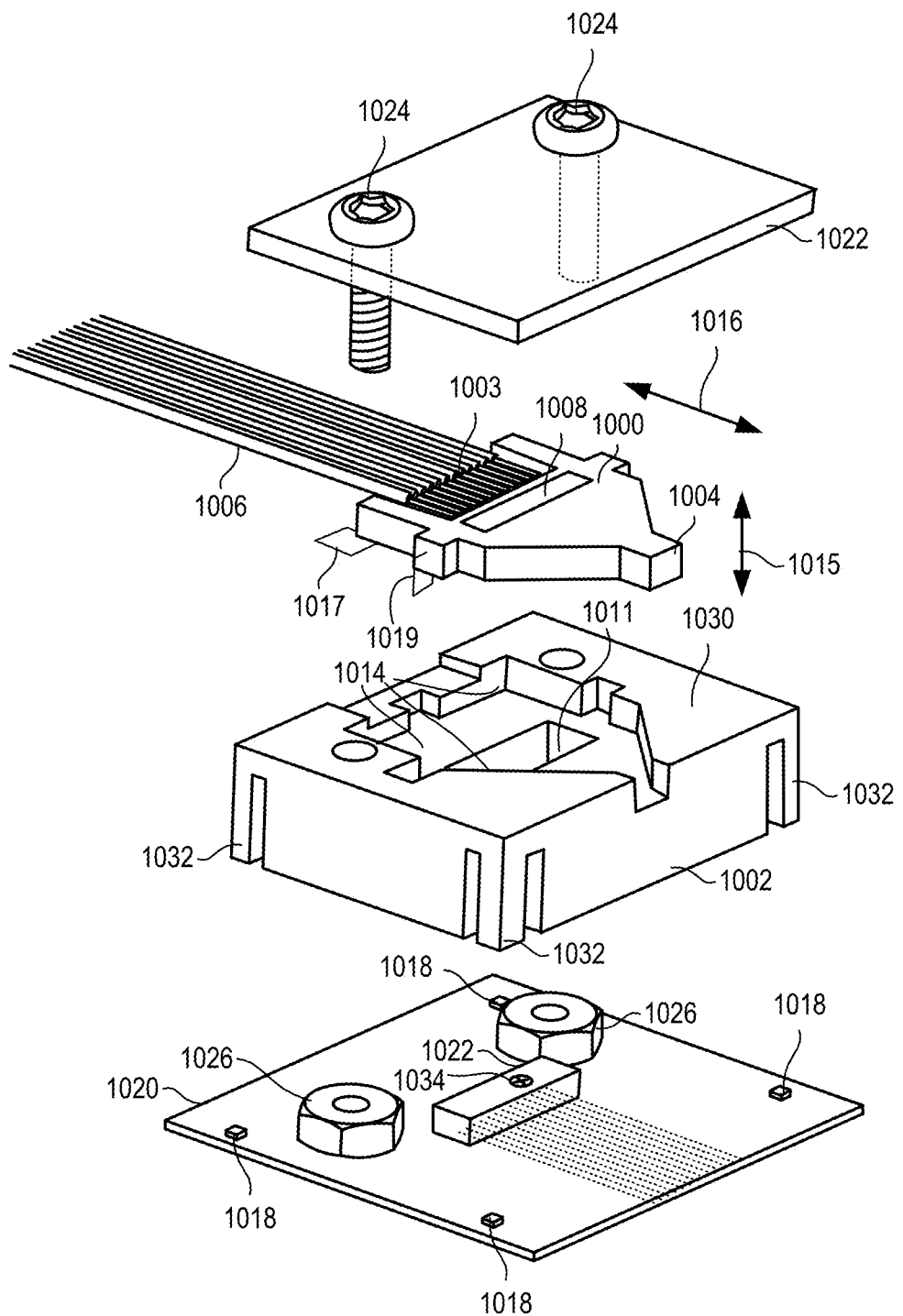
FIG. 10 is a perspective, exploded, view of an optical connector system according to an example embodiment.

In FIG. 10, a perspective exploded view shows an optical connecting arrangement according to another example embodiment. An optical ferrule 1000 and cradle 1002 are made of materials with the same or similar CTE. The optical ferrule 1000 includes an attachment area 1003 that receives and permanently attaches an optical fiber ribbon 1006. A distal tip 1004 of the optical ferrule 1000 is opposed to the attachment area 1003 along a longitudinal direction 1016. The ferrule 1000 includes a light redirecting member 1008 that redirects light between the optical fiber ribbon 1006 in direction 1016 and an optical device 1022 in direction 1015, which is directed towards to a substrate 1020 to which the cradle 1002 is attached. The redirected light 1009 exits and enters the optical ferrule 1000 at exit locations (not shown) on a mating plane 1017, which corresponds to a mating surface (not shown) of the ferrule 1000. The optical exit locations are substantially centered on an alignment plane 1019 normal to the first direction 1016. Note that the cradle 1002 includes a void 1011 which facilitates passing the light 1009 between the ferrule 1000 and optical device 1022.

In FIG. 10, the ferrule 1000 is shown separated from the cradle 1002. The cradle 1002 is configured to receive and secure the optical ferrule 1000 as the ferrule 1000 is moved downward in first direction 1015. For example, the cradle 1002 includes surfaces 1014 onto or next to which the ferrule 100 is placed and is at least partially constrained. Additional constraints may be provided by a cover 1022 that traps the ferrule 1000 into the cradle 1002. The illustrated cover 1022 is held in place by screws 1024 that fasten to nuts trapped in recesses 1206 in the cradle. Note that other attachment means such as clips or bonding may be used to secure the cover 1022 to the cradle 1002 and substrate 1020.

Figure 11:
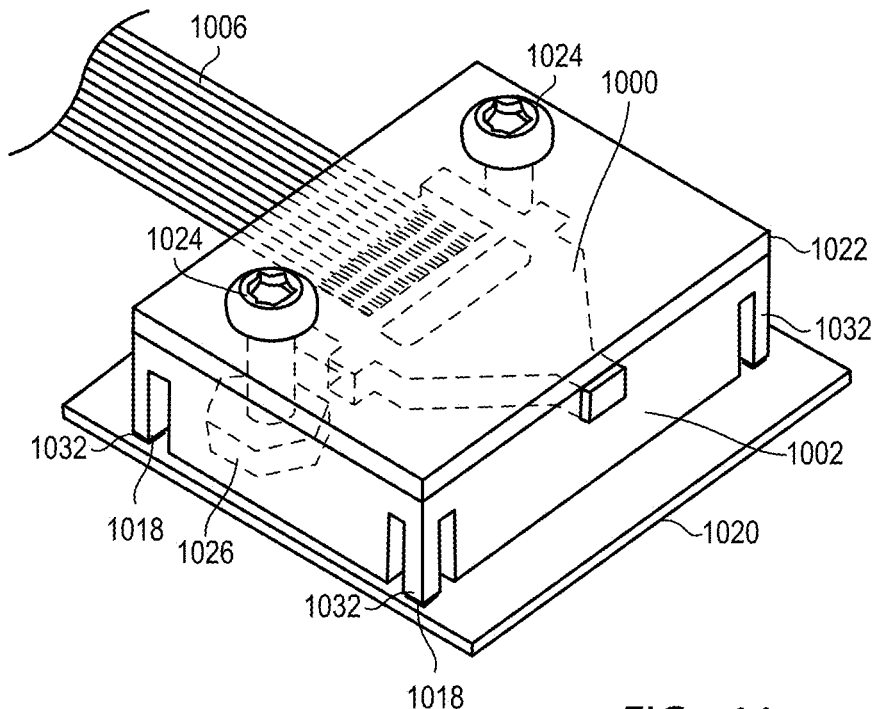
FIG. 11 is a perspective view of the optical connector system of FIG. 10.

The cradle 1002 may be permanently attached to the substrate 1020 before assembly of the ferrule 1000 with the cradle 1002. As indicated by pads 1018, this attachment may include soldering or other types of bonding. The bonding pads 1018 are usable with a bonding material that bonds the cradle 1002 to the substrate 1020 at the bonding temperature. The cradle 1002 can be precisely placed over the optical device 1022, e.g., via a pick and place machine, and then secured to the substrate 1020 through the application of heat, light-cured adhesive, etc. Thereafter, the cradle 1002 and substrate 1020 form a subassembly to which the ferrule 1000 and fiber optic ribbon 1006 may be attached, e.g., at room temperature manually or via a robotic device. The final assembly, which includes attachment of the cover 1022, can be seen in the perspective view of FIG. 11.

Figure 12:
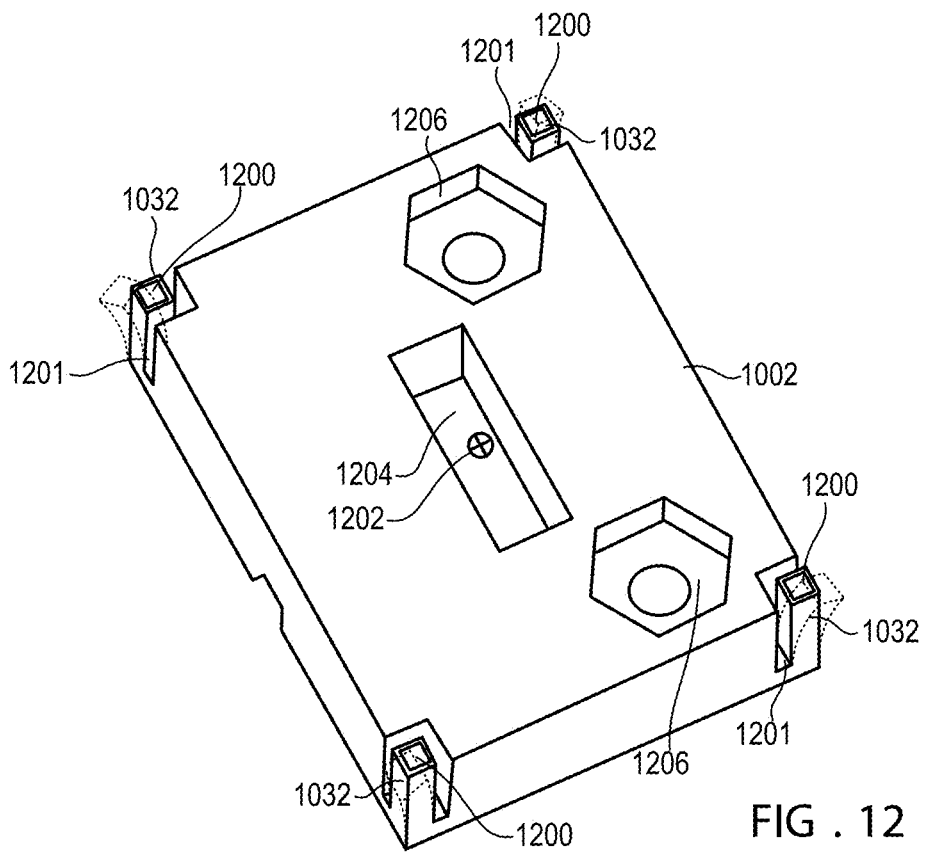
FIG. 12 is a perspective view of a cradle used in the optical connector system of FIG. 10.

The cradle 1002 includes two or more mounting members, which in this example are configured as legs 1032 affixed near a top surface 1030 of the cradle that is opposed to two more bonding pads (see bonding pads 1200 in FIG. 12) of the cradle 1002. The cradle 1002 has a first thermal expansion coefficient and the substrate 1020 has a second thermal expansion coefficient different than the first thermal expansion coefficient. Due to these differences in thermal expansion coefficient, the cradle 1002 will expand or contract relative to the substrate 1020 at different temperatures. As seen in the perspective view of FIG. 12, the legs 1032 can deflect as indicated by the dashed lines. The legs 1032 can also deflect in the other direction, due to gaps 1201 between the legs 1032 and the body of the cradle 1002. In other embodiments, three or more legs may be each affixed at a different edge of the cradle 1002 instead of or in addition to the corner legs (see mounting members 840 in FIG. 8).

The legs 1032 are located around the perimeter of the cradle 1002, and all have the same dimensions. When the legs 1032 flex due to thermal expansion, a reference point 1202 of the cradle 1002 will experience minimum deflection relative to a corresponding reference point (see point 1034 in FIG. 10) of the optical device 1022. Thus the legs 1032 will be arranged symmetrically around the reference point 1202, which may be different than a center point of the cradle. Note that the cradle includes a void 1204 through which light passes between the ferrule 1000 and the optical device 1022. Thus the reference point 1202 is located in this void. Generally, the reference points described here and elsewhere are abstract geometric features, and do not need to correspond to a physical feature (e.g., surface, volume) of the objects that are being aligned.

Figure 13:
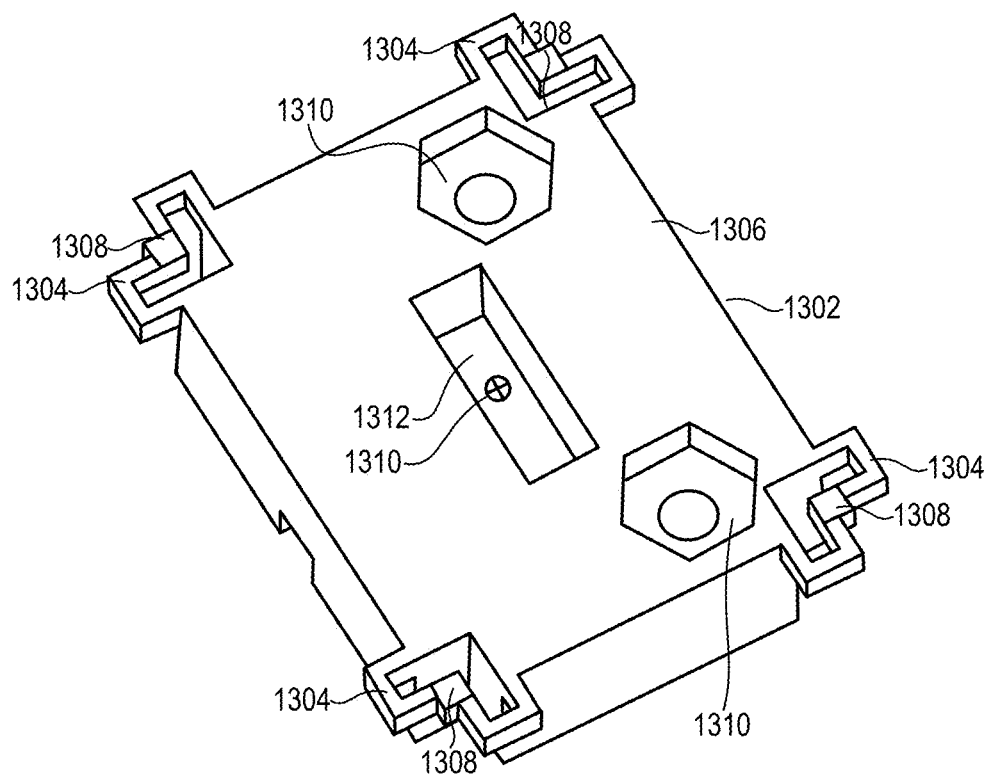
FIG. 13 is a perspective view of a cradle according to another example embodiment.

In FIG. 13, a perspective view shows a cradle 1302 according to another example embodiment. This cradle 1302 may be used with ferrules described earlier (e.g., ferrule 1000 shown in FIG. 10) and has a same or similar CTE as the ferrule. The cradle 1302 includes two or more mounting members that in this example are configured as hollow prisms 1304 that extend from a bottom surface 1306 of the cradle 1302. The bottom surface 1306 faces a substrate to which the cradle 1302 is bonded.

The cradle 1302 has bonding pads 1308 that are usable with a bonding material that bonds the cradle 1302 to a substrate at a bonding temperature. The cradle 1302 has a first thermal expansion coefficient and the substrate has a second thermal expansion coefficient different than the first thermal expansion coefficient. The mounting members can flex when the cradle 1302 expands or contracts relative to the substrate due to a change in temperature. The hollow prisms 1304 are located around the perimeter of the cradle 1302, and all have the same dimensions. Hollow cylinders may be used instead of or in addition to the hollow prisms 1304. The prisms 1304 are also symmetrically arranged around a reference point 1310 of the cradle 1302 (located in light pass-thru void 1312). Thus, when the hollow prisms 1304 flex due to thermal expansion, the reference point 1310 will experience minimum deflection relative to a corresponding reference point of the optical device that is mounted to or part of the substrate. The cradle also has recesses 1310 that are used to retain nuts 1026 that mate with screws 1024 to hold the top 1022 in place thus retaining the ferrule in the cradle.

Figure 14A:
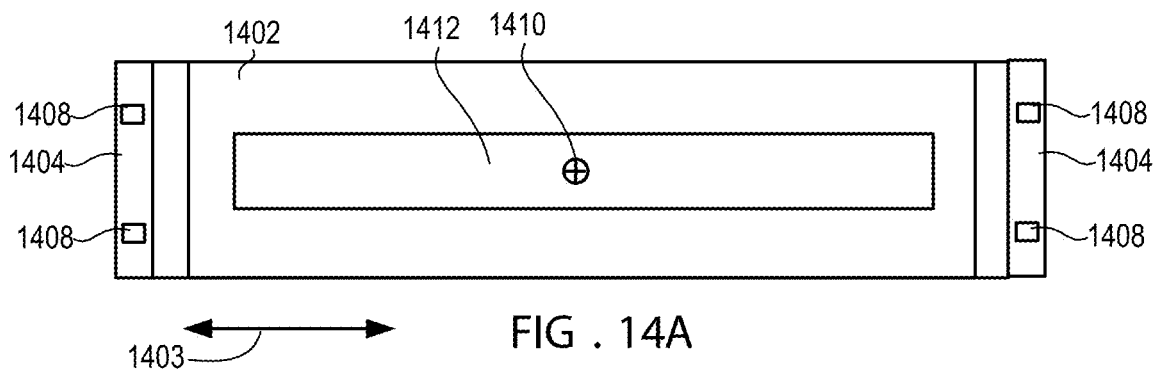
FIGS. 14A and 14B are bottom and side views of a cradle according to another example embodiment.
Figure 14B:
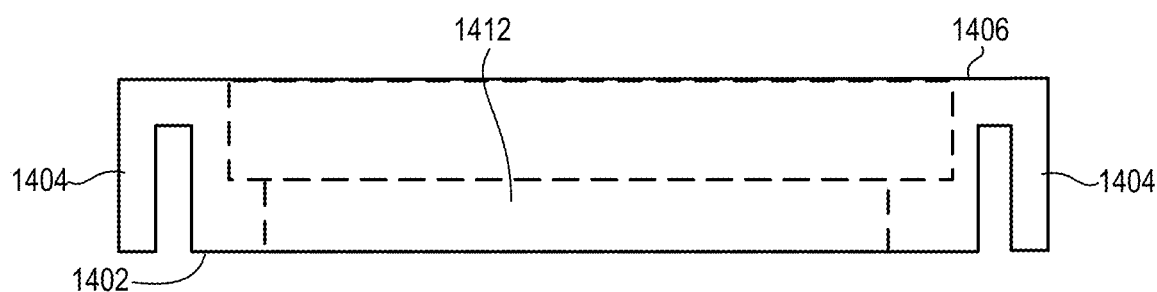

In FIGS. 14A-B, bottom and side views shows cradle 1402 according to another example embodiment. This cradle 1402 may be used with a ferrule that has a same or similar CTE as the cradle 1402. Generally, the geometry of the ferrule will be different than previous illustrations, e.g., having a row or array of optical output locations larger in a side-to-side direction 1403 than previously shown. The cradle 1402 includes two mounting members that in this example are configured as legs 1404 that extend from a top surface 1406 of the cradle 1402. The bottom surface 1412 faces a substrate to which the cradle 1402 is bonded.

The cradle 1402 has bonding pads 1408 that are usable with a bonding material that bonds the cradle 1402 to a substrate at a bonding temperature. The cradle 1402 has a first thermal expansion coefficient and the substrate has a second thermal expansion coefficient different than the first thermal expansion coefficient. The mounting members 1404 can flex when the cradle 1402 expands or contracts relative to the substrate due to a change in temperature. The mounting members 1404 are located on ends of the cradle 1402, and have the same dimensions. The mounting members 1404 are symmetric about a reference point 1410 of the cradle 1402 (located in light pass-thru void 1412). Thus, when the hollow cylinders 1404 flex due to thermal expansion, the reference point 1410 will experience minimum deflection relative to a corresponding reference point of the optical device that is mounted to or part of the substrate.

Figure 15:
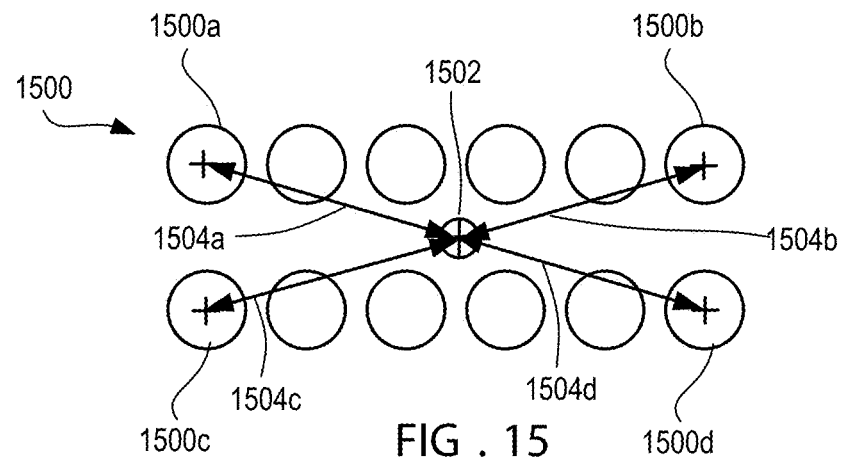
FIGS. 15 and 16 are diagrams of optical input/output locations of an optical ferrule according to example embodiments.

In the embodiments described above, geometry of a cradle is designed to minimize displacement of a reference point of a ferrule that is held in the cradle. Generally, this minimizes the net displacement of a plurality of optical input/output locations of the ferrule relative to an optical device. An example of this is shown in the diagram of FIG. 15. A plurality of optical input/output locations 1500 are arranged into two rows. A reference point 1502 is centered horizontally at the middle of the rows and centered vertically between the rows. During expansion or contraction of the ferrule, input/output locations 1500a-d will experience the greatest displacements, as the distances 1504a-d of the centers of these locations is furthest from the reference point 1502. If the reference point 1502 is moved elsewhere, at least one of the distances 1504a-d will increase, thus risking greater misalignment for at least one of the input/output locations 1500a-d than for the others.

Figure 16:
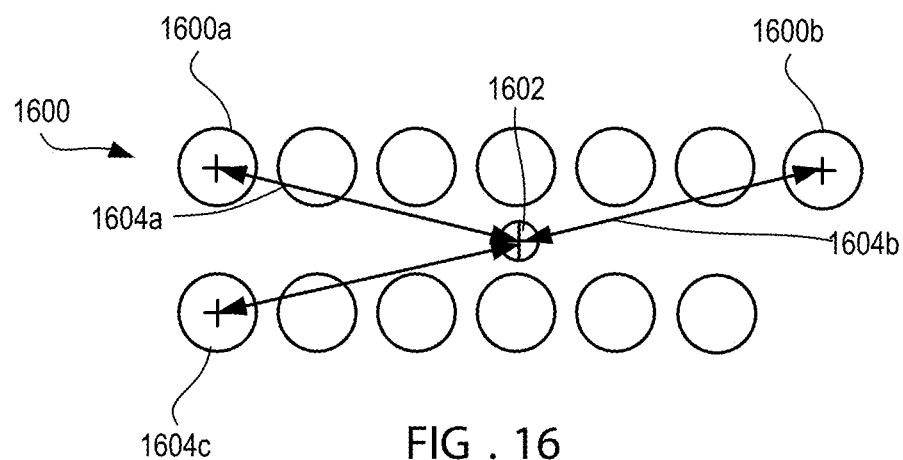

Generally, reference point may be chosen to minimize the distance to the furthest input/output location. This may optionally be applied to non-symmetric patterns. A non-symmetric arrangement of input/output locations 1600 according to an example embodiment is shown in the diagram of FIG. 16. In this case, the reference point 1602 is centered horizontally at the middle of the top row and centered vertically between the rows. This results in input/output locations 1600a-c having the greatest displacement to expansion/contraction, as the distances 1604a-c of the centers of these locations is furthest from the reference point 1602. In other embodiments, the centroid of a shape formed by the input/output locations 1600 may be used instead, which would shift the reference point slightly to the left and upwards from what is shown here.

Figure 17:
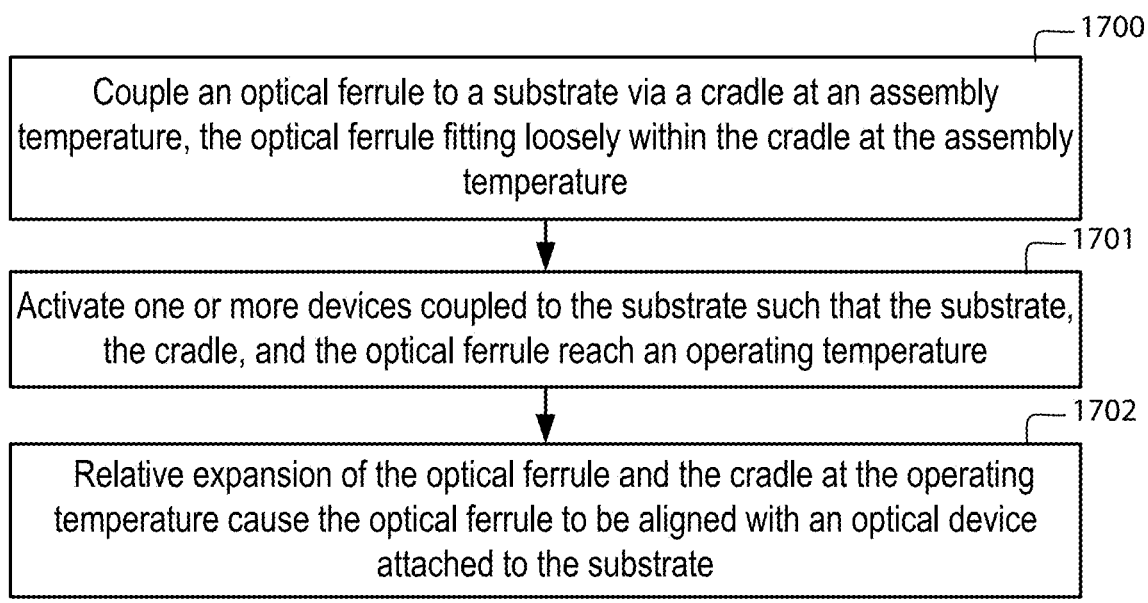
FIGS. 17 and 18 are flowcharts of methods according to example embodiments.

In FIG. 17, a flowchart shows a method according to an example embodiment. The method involves coupling 1700 an optical ferrule to a substrate via a cradle at an assembly temperature. The optical ferrule fits loosely within the cradle at the assembly temperature. The optical ferrule has a first thermal expansion coefficient and the cradle has a second thermal expansion coefficient different than the first thermal expansion coefficient. One or more devices coupled to the substrate are activated 1701 such that the substrate, the cradle, and the optical ferrule reach an operating temperature. Relative expansion 1702 of the optical ferrule and the cradle at the operating temperature cause the one or more output locations of the optical ferrule to be aligned with an optical device attached to the substrate.

Figure 18:
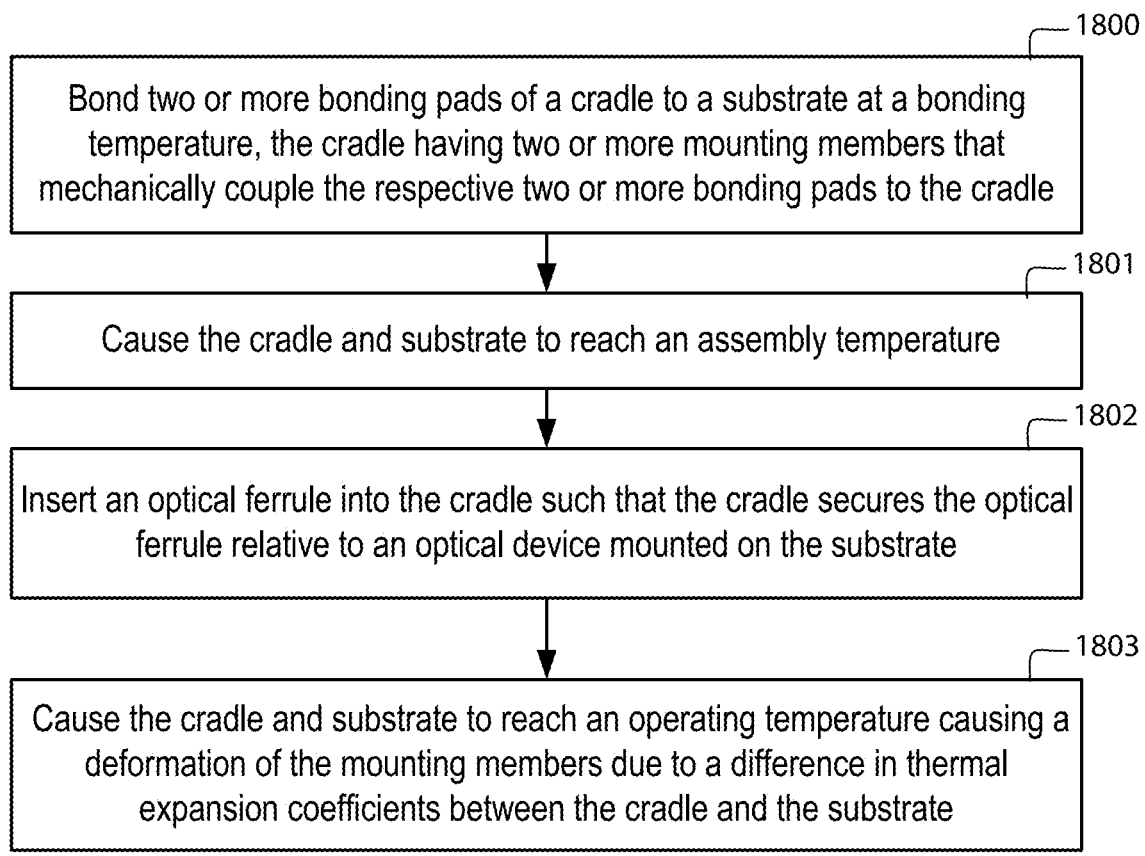

In FIG. 18, a flowchart shows a method according to another example embodiment. The method involves bonding 1800 two or more bonding pads of a cradle to a substrate at a bonding temperature. The cradle has two or more mounting members that mechanically couple the respective two or more bonding pads to the cradle. The cradle and substrate are caused 1801 to reach an assembly temperature. An optical ferrule is inserted 1802 into the cradle such that the cradle secures the optical ferrule relative to an optical device mounted on the substrate. The cradle and substrate are caused 1803 to reach an operating temperature. The difference between the bonding temperature and the operating temperature causes a deformation of the mounting members due to a difference in thermal expansion coefficients between the cradle and the substrate. The deformation maintains alignment between the optical device and optical ferrule.

Figure 19:
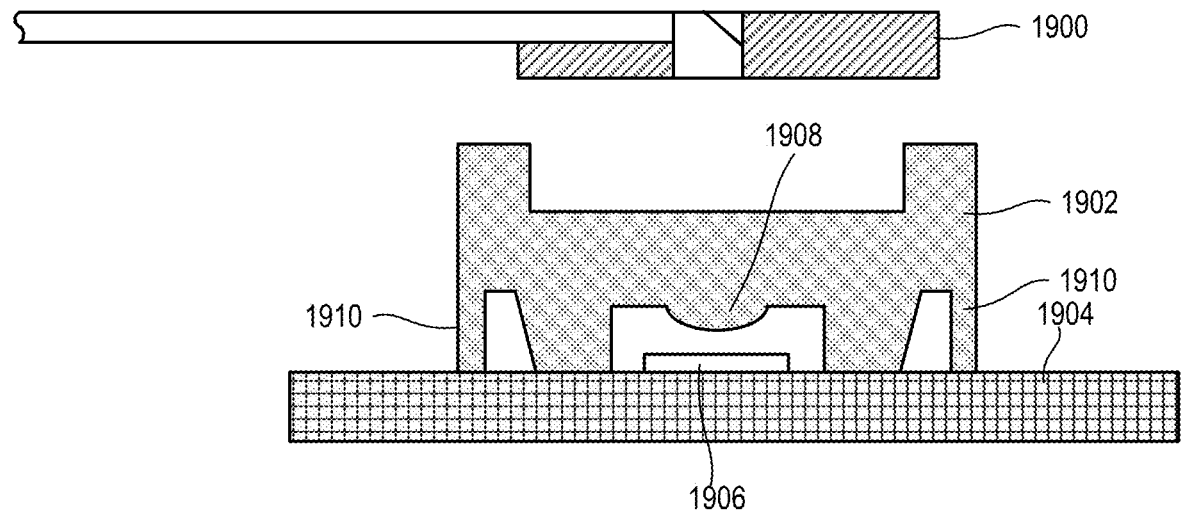
FIG. 19 is a side view of an optical ferrule and cradle in accordance with some embodiments.

In FIG. 19, a side view shows an optical subassembly according to another example embodiment. An optical ferrule 1900 and cradle 1902 may be configured similar to other ferrules described above. The cradle 1902 is configured to receive and secure the ferrule 1900 to a substrate 1904 such that the ferrule is optically aligned with an optical device 1906 at an operating temperature. The cradle 1902 includes a lens 1908 configured to modify a light path between the optical ferrule 1900 and the optical device 1906. Some or all of cradle 1902 may be formed of a material that is transparent to wavelengths of light of interest. The lens 1908 may be a collimating lens that substantially collimates light transferred between the optical ferrule 1900 and the optical device 1906. Two or more mounting members 1910 mechanically couple the cradle 1902 to the substrate 1904. The two or more mounting members 1910 reversibly deflect in response to a force applied at an end of the members 1910 where they are joined with the substrate 1904.

Figure 21:
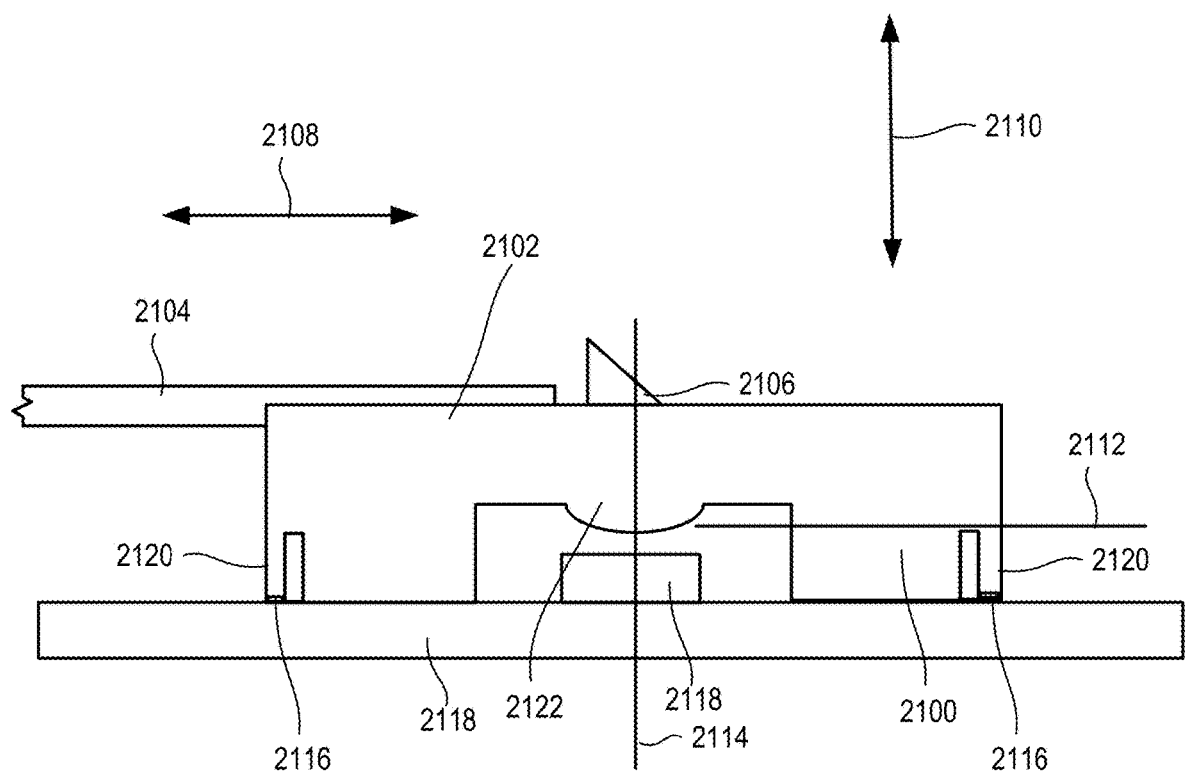
FIG. 21 is a side view of an optical component according to an example embodiment.

In FIG. 21, a side view shows an optical component 2100 according to another example embodiment, in which ferrules and cradles described above are formed as a single, integral piece. The optical component has an attachment area 2102 for receiving and permanently attaching a plurality of optical fibers 2104. A light redirecting member 2106 receives light along a first direction 2108 from the plurality of optical fibers 2102 and redirects the light along a different second direction 2110. The redirected light exits the optical component 2100 at exit locations on a mating plane 2112. The exit locations are substantially centered on a first alignment plane 2114 normal to the first direction.

Two or more bonding pads 2116 are usable with a bonding material that bonds the optical component 2100 to a substrate 2118 at a bonding temperature. The component 2100 is formed of a material (e.g., transparent, optics-grade plastic) a first thermal expansion coefficient and the substrate 2118 has a second thermal expansion coefficient different than the first thermal expansion coefficient. Two or more mounting members 2120 mechanically couple the respective two or more bonding pads 2116 to the component 2100. The two or more mounting members 2120 reversibly deflect in response to a force applied between the bonding pad and attachment regions of the two or more mounting members to the component 2100, such that the location of the intersection of the first alignment plane 2114 with the substrate 2118 is minimally affected by temperature. The optical component 2100 may include a lens 2122 configured to modify a light path between the component and an optical device 2124, the optical device 2124 located on the substrate 2118.

Additional information regarding connectors that may be used in conjunction with the approaches described herein is provided in the following commonly owned and concurrently filed U.S. Patent Applications which are incorporated herein by reference: U.S. patent application Ser. No. 61/710,077, having the title "Optical Connector", U.S. patent application Ser. No. 62/642,629, having the title "Optical Connector with Tilted Mirror"; U.S. patent application Ser. No. 62/239,996, having the title "Optical Ferrules and Optical Ferrule Molds".

Embodiments described in this disclosure include:

Item 1. An optical ferrule comprising:
    an attachment area for receiving and permanently attaching to a plurality of optical fibers;
    a light redirecting member for receiving light, along a first direction, from a plurality of fibers received by and permanently attached to the attachment area and redirecting the received light along a different second direction the redirected light exiting the ferrule at exit locations on a mating plane, the exit locations being substantially centered on a first alignment plane normal the first direction;
    a pair of first engagement features protruding from opposite lateral sides of the optical ferrule, the first engagement features being substantially centered on the first alignment plane; and
    a second engagement feature, different from the pair of first engagement features, protruding from a front side of the optical ferrule, and substantially centered on a second alignment plane perpendicular to the first alignment plane, the second alignment plane bisecting the exit locations into substantially equal halves.

Item 2. The optical ferrule of Item 1, wherein the exit locations comprise a row of optical output locations along the first alignment plane.

Item 3. The optical ferrule of any of Items 1-2, wherein the first engagement features comprise first and second tabs extending from the opposite lateral sides of the optical ferrule, the first and second tabs located within respective first and second cavities of a cradle that secures the optical ferrule, the first and second cavities constraining the two tabs along the first direction when the optical ferrule is fit into the cradle.

Item 4. The optical ferrule of Item 3, further comprising first and second lateral clearances between the first and second tabs and the respective first and second cavities such that the tab can displace in a lateral direction, wherein there is little or no clearance between the first and second tabs and the respective first and second cavities in the first direction.

Item 5. The optical ferrule of any of Items 1-4, wherein the second engagement feature comprises a tab extending from the front side, the tab being placed in a cavity of a cradle configured to secure the ferrule.

Item 6. The optical ferrule of Item 5, further comprising a clearance between the tab and the cavity such that the tab can displace in the first direction, wherein there is little or no clearance between the first and second tabs and the respective first and second cavities in the lateral direction.

Item 7. The optical ferrule of any of Items 1-6, wherein the optical ferrule is formed of a polymer.

Item 8. The optical ferrule of any of Items 1-7, further comprising a mating surface that optically interfaces with an optical device on a substrate.

Item 9. The optical ferrule of any of Items 1-8, wherein the optical ferrule is configured to loosely fit into a cradle at an assembly temperature and to tightly fit into the cradle at an operating temperature.

Item 10. The optical ferrule of Item 9, wherein the assembly temperature is lower than the operating temperature.

Item 11. An optical ferrule, comprising:
- an attachment end configured to receive and secure an optical waveguide;
- a distal tip opposed to the attachment end along a longitudinal direction;
- a light redirecting element configured to redirect light between the optical waveguide and a mating surface of the optical ferrule;
- a longitudinal constraint member operable to interface with a corresponding longitudinal constraint member of a cradle that receives and secures the optical ferrule; and
- a side-to-side constraint member operable to interface with a corresponding side-to-side constraint member of the cradle, wherein the longitudinal and side-to-side constraint members minimize displacement of a reference point of the optical ferrule relative to a corresponding reference point of the cradle due to different thermal expansion coefficients of the optical ferrule and the cradle causing a change in size of the optical ferrule relative to the cradle in response to a change of temperature.

Item 12. The optical ferrule of Item 11, wherein the mating surface comprises a row of optical output locations along a side-to-side line, the reference point being at a center of the side-to-side line.

Item 13. The optical ferrule of Item 12, wherein the longitudinal constraint member comprises two tabs extending from opposing sides of the optical ferrule and aligned with the side-to-side line, the corresponding longitudinal constraint members of the cradle comprising two cavities that respectively constrain the two tabs longitudinally and allow side-to-side displacement of the two tabs when the optical ferrule is fit into the cradle.

Item 14. The optical ferrule of any of Items 12-13, wherein the side-to-side constraint member comprises a tab extending from the distal tip aligned with the center of the side-to-side line, the corresponding side-to-side constraint member comprising a cavity that constrains side-to-side displacement of the tab and allows longitudinal displacement of the tab when the optical ferrule is fit into the cradle.

Item 15. The optical ferrule of any of Items 11-14, wherein a first thermal coefficient of expansion of the optical ferrule is larger than a second thermal coefficient of expansion of the cradle.

Item 16. The optical ferrule of Item 15, wherein the optical ferrule is formed of a polymer.

Item 17. The optical ferrule of any of Items 11-16, wherein the mating surface is operable to optically interface with an optical device on a substrate, wherein the cradle aligns the optical ferrule with the optical device.

Item 18. The optical ferrule of any of Items 11-17, wherein the optical ferrule is configured to loosely fit into the cradle at an assembly temperature and to tightly fit into the cradle at an operating temperature.

Item 19. The optical ferrule of Item 18, wherein the assembly temperature is lower than the operating temperature.

Item 20. A cradle configured to receive and secure an optical ferrule, the cradle comprising:
- a corresponding longitudinal constraint member operable to interface with a longitudinal constraint member of the optical ferrule; and
- a corresponding side-to-side constraint member operable to interface with a side-to-side constraint member of the optical ferrule, wherein the longitudinal and side-to-side constraint members minimize displacement of a reference point of a mating surface of the optical ferrule with a corresponding reference point of the cradle due to a change in size of the optical ferrule relative to the cradle, the change in size being induced by different thermal expansion coefficients of the optical ferrule and the cradle and a change in temperature.

Item 21. The cradle of Item 20, wherein the mating surface comprises a row of optical output locations along a side-to-side line, the reference point being at a center of the side-to-side line.

Item 22. The cradle of Item 21, wherein the longitudinal constraint member of the optical ferrule comprises two tabs extending from opposing sides of the optical ferrule and aligned with the side-to-side line, the corresponding longitudinal constraint members of the cradle comprising two cavities that respectively constrain the two tabs and allow side-to-side displacement of the two tabs when the optical ferrule is fit into the cradle.

Item 23. The cradle of any of Items 21-22, wherein the side-to-side constraint member comprises a tab extending from a distal tip of the optical ferrule that is aligned with the center of the side-to-side line and the corresponding side-to-side constraint member comprises a cavity that constrains side-to-side displacement of the tab and allows longitudinal displacement of the tab when the optical ferrule is fit into the cradle.

Item 24. The cradle of any of Items 20-23, wherein a first thermal coefficient of expansion of the optical ferrule is larger than a second thermal coefficient of expansion of the cradle.

Item 25. The cradle of Item 24, wherein the cradle is formed of a ceramic.

Item 25a. The cradle of Item 24 where the cradle is formed of silica.

Item 26. The cradle of any of Items 20-25a, wherein the cradle aligns and secures the optical ferrule to a substrate such that the mating surface optically interfaces with an optical device on the substrate.

Item 27. The cradle of any of Items 20-26, wherein the optical ferrule is configured to loosely fit into the cradle at an assembly temperature and to tightly fit into the cradle at an operating temperature.

Item 28. The cradle of Item 27, wherein the assembly temperature is lower than the operating temperature.

Item 28a. The cradle of any of Items 20-28, further comprising a lens configured to modify a light path between the optical ferrule and an optical device, the optical device located on a substrate to which the cradle is attached.

Item 28b. The cradle of Item 28a, wherein the lens comprises a collimating lens.

Item 28c. The cradle of any of Items 20-28b, further comprising second corresponding longitudinal and side-to-side constraint members configured to minimize a second displacement of a second reference point of a second optical ferrule with a corresponding second reference point of the cradle due to a change in size of the second optical ferrule relative to the cradle.

28d. The cradle of any of Items 20-28c, further configured to receive and secure two or more ferrules.

Item 29. An optical assembly, comprising:
  an optical ferrule comprising a light redirecting element configured to redirect light between an optical waveguide and a mating surface of the optical ferrule, the optical ferrule having a first thermal expansion coefficient; and
  a cradle configured to hold and secure the optical ferrule to a substrate, the cradle having a second thermal expansion coefficient different than the first thermal expansion coefficient, wherein the optical ferrule is configured to fit loosely within the cradle at an assembly temperature and to expand into the cradle at an operating temperature.

Item 30. The optical assembly of Item 29, wherein the optical ferrule comprises at least one constraint member and the cradle comprises at least one corresponding constraint member, the constraint member and corresponding constraint member interfacing such that a displacement between a reference point of the optical ferrule and a corresponding reference point of the cradle is minimized between the assembly temperature and the operating temperature.

Item 31. The optical assembly of Item 30, wherein the optical ferrule comprises a row of optical output locations arranged in a side-to-side line along the mating surface, the reference point being at a center of the side-to-side line.

Item 32. The optical assembly of any of Items 29-30, wherein the at least one constraint member comprises a longitudinal constraint member and a side-to-side constraint member, and the at least one corresponding constraint member comprises a corresponding longitudinal constraint member that interfaces with the longitudinal constraint member and a corresponding side-to-side constraint member that interfaces with the side-to-side longitudinal constraint member.

Item 33. The optical assembly of Item 32, further comprising a side-to-side clearance between the longitudinal constraint member and the corresponding longitudinal constraint member such that the longitudinal constraint member can displace in a side-to-side direction, and wherein there is little or no clearance between the longitudinal constraint member and the corresponding longitudinal constraint member in a longitudinal direction.

Item 34. The optical assembly of any of Items 29-33, wherein the assembly temperature is lower than the operating temperature.

Item 35. The optical assembly of any of Items 29-34, wherein the optical ferrule is formed of a polymer and the cradle is formed of a ceramic.

Item 36. The optical assembly of any of Items 29-35, further comprising an optical device attached to the substrate, the cradle aligning one or more optical output locations of the optical ferrule with the optical device.

Item 37. The optical assembly of Item 36, wherein at least part of the one or more optical output locations are misaligned with the optical device at the assembly temperature and the one or more optical output locations are optimally aligned with the optical device at the operating temperature.

Item 37a. The optical assembly of any of Items 29-37, wherein the cradle further comprises a lens configured to modify a light path between the optical ferrule and an optical device, the optical device located on the substrate.

Item 37b. The optical assembly of Item 37a, wherein the lens comprises a collimating lens.

Item 37c. The optical assembly of any of Items 29-37b, wherein the cradle is further configured to hold and secure a two or more optical ferrules to a substrate.

Item 37d. The optical assembly of any of Items 29-37c, wherein the cradle and the optical ferrule are formed integrally.

Item 38. A method, comprising:
  coupling an optical ferrule to a substrate via a cradle at an assembly temperature, the optical ferrule fitting loosely within the cradle at the assembly temperature, the optical ferrule having a first thermal expansion coefficient and the cradle having a second thermal expansion coefficient different than the first thermal expansion coefficient; and
  activating one or more devices coupled to the substrate such that the substrate, the cradle, and the optical ferrule reach an operating temperature, wherein relative expansion of the optical ferrule and the cradle at the operating temperature cause the one or more output locations of the optical ferrule to be aligned with an optical device attached to the substrate.

Item 38a. The method of Item 38, wherein the relative expansion of the optical ferrule and the cradle at the operating temperature causes the optical ferrule to fit tightly within the cradle.

Item 39. The method of any of Items 38-38a, further comprising transferring light between the optical ferrule and the optical device via the one or more output locations at a mating surface of the optical ferrule at the operating temperature.

Item 40. The method of Item 39, wherein transferring light between the optical ferrule and the optical device comprises redirecting light between the mating surface and an optical waveguide coupled to an end of the optical ferrule.

Item 41. The method of Item 40, further comprising minimizing a displacement between a reference point of the optical ferrule and a corresponding reference point of the cradle between the assembly temperature and the operating temperature.

Item 42. The method of Item 41, wherein the displacement is minimized via:
  at least one longitudinal constraint member of the optical ferrule that interfaces with at least one corresponding longitudinal constraint member of the cradle; and
  at least one side-to-side constraint member of the optical ferrule that interfaces with at least one corresponding side-to-side constraint member of the cradle.

Item 43. A cradle configured to receive and secure an optical ferrule, the cradle comprising:
  a restraining member configured to restrain the optical ferrule; and
  two or more bonding pads usable with a bonding material that bonds the cradle to a substrate at a bonding temperature, the cradle having a first thermal expansion coefficient and the substrate having a second thermal expansion coefficient different than the first thermal expansion coefficient; and
  two or more mounting members that mechanically couple the respective two or more bonding pads to the cradle, the two or more mounting members reversibly deflecting in response to a force applied between the bonding pad and attachment regions of the two or more mounting members to the cradle, the force due to the different first and second expansion coefficients.

Item 44. The cradle of Item 43, wherein the two or more mounting members comprises two or more legs affixed near a top surface of the cradle that is opposed to the two more bonding pads.

Item 45. The cradle of Item 44, wherein the two or more legs comprise four or more legs each affixed at a different corner of the cradle.

Item 46. The cradle of any of Items 44-45, wherein the two or more legs comprise three or more legs each affixed at a different edge of the cradle.

Item 47. The cradle of any of Items 43-46, wherein the two or more mounting members comprises two or more hollow cylinders or hollow prisms that extend from a bottom surface of the cradle that faces the substrate.

Item 48. The cradle of any of Items 43-47, wherein the two or more mounting members are symmetrically arranged relative to the cradle such that the reversible deflection minimizes displacement of a reference point of the optical ferrule relative to a corresponding reference point of the substrate.

Item 49. The cradle of Item 48, wherein the displacement is minimized when the cradle expands or contracts relative to the substrate due to a change in temperature.

Item 49a. The cradle of any of Items 43-49, further comprising a lens configured to modify a light path between the optical ferrule and an optical device, the optical device located on a substrate to which the cradle is attached.

Item 49b. The cradle of Item 49a, wherein the lens comprises a collimating lens.

Item 50. A cradle configured to receive and secure an optical ferrule, the cradle comprising:
  a restraining member configured to restrain the optical ferrule; and
  two or more bonding pads with a bonding material that bonds the cradle to a substrate at the bonding temperature, the cradle having a first thermal expansion coefficient and the substrate having a second thermal expansion coefficient different than the first thermal expansion coefficient; and
  two or more mounting members that mechanically couple the respective two or more bonding pads to the cradle, the two or more mounting members deformable in response to expansions of the cradle relative to the substrate, the relative change in expansions due to a change between a bonding temperature and an operating temperature, the two or more mounting members deformable such that the cradle maintains an alignment between the optical ferrule and an optical device attached to the substrate at least at the operating temperature.

Item 51. The cradle of Item 50, wherein the two or more mounting members comprises two or more legs affixed near a top surface of the cradle that is opposed to the two more bonding pads.

Item 52. The cradle of Item 51, wherein the two or more legs comprise four or more legs each affixed at a different corner of the cradle.

Item 53. The cradle of any of Items 51-52, wherein the two or more legs comprise three or more legs each affixed at a different edge of the cradle.

Item 54. The cradle of any of Items 50-53, wherein the two or more mounting members comprises two or more hollow cylinders or hollow prisms that extend away from a bottom surface of the cradle that faces the substrate.

Item 55. The cradle of any of Items 50-54, wherein the two or more mounting members are symmetrically arranged relative to the cradle such that the reversible deflection minimizes displacement of a reference point of the optical ferrule relative to a corresponding reference point of the substrate.

Item 56. The cradle of Item 55, wherein the displacement is minimized when the cradle expands or contracts relative to the substrate due to a change in temperature.

Item 56a. The cradle of any of Items 50-56, further comprising a lens configured to modify a light path between the optical ferrule and the optical device.

Item 56b. The cradle of Item 56a, wherein the lens comprises a collimating lens.

Item 57. A method, comprising:
  bonding two or more bonding pads of a cradle to a substrate at a bonding temperature, the cradle comprising two or more mounting members that mechanically couple the respective two or more bonding pads to the cradle;
  causing the cradle and substrate to reach an assembly temperature, the difference between the bonding temperature and the assembly temperature causing a deformation of the mounting members due to a difference in thermal expansion coefficients between the cradle and the substrate; and
  inserting an optical ferrule into the cradle such that the cradle secures the optical ferrule relative to an optical device mounted on the substrate.

Item 58. The method of Item 57, further comprising activating one or more devices coupled to the substrate such that the substrate, the cradle, and the optical ferrule reach an operating temperature, wherein expansion of the cradle relative to the substrate at the operating temperature brings the optical ferrule into alignment with the optical device.

Item 59. The method of Item 58, further comprising transferring light between the optical ferrule and the optical device via the one or more output locations at a mating surface of the optical ferrule at the operating temperature.

Item 60. The method of Item 59, wherein transferring light between the optical ferrule and the optical device comprises redirecting light between the mating surface and an optical waveguide coupled to an end of the optical ferrule.

Item 61. An optical component comprising:
  an attachment area for receiving and permanently attaching a plurality of optical waveguides;
  a light redirecting member for receiving light along a first direction from a plurality of optical fibers received by and permanently attached to the attachment area and redirecting the light along a different second direction, the redirected light exiting the ferule at exit locations on a mating plane, the exit locations being substantially centered on a first alignment plane normal the first direction;
  two or more bonding pads usable with a bonding material that bonds the component to a substrate at a bonding temperature, the component having a first thermal expansion coefficient and the substrate having a second thermal expansion coefficient different than the first thermal expansion coefficient; and
  two or more mounting members that mechanically couple the respective two or more bonding pads to the component, the two or more mounting members reversibly deflecting in response to a force applied between the bonding pad and attachment regions of the two or more mounting members to the component, such that the location of the intersection of the first alignment plane with the substrate is minimally affected by temperature.

Item 62. The optical assembly of Item 61, wherein the component further comprises a lens configured to modify a light path between the component and an optical device, the optical device located on the substrate.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A method, comprising:
   bonding two or more bonding pads of a cradle to a substrate at a bonding temperature, the cradle comprising two or more mounting members that mechanically couple the respective two or more bonding pads to the cradle;
   causing the cradle and substrate to reach an assembly temperature, the difference between the bonding temperature and the assembly temperature causing a deformation of the mounting members due to a difference in thermal expansion coefficients between the cradle and the substrate; and
   inserting an optical ferrule into the cradle such that the cradle secures the optical ferrule relative to an optical device mounted on the substrate.

2. The method of claim 1, wherein the mounting members comprise one or more of legs, hollow cylinders, and hollow prisms.

3. The method of claim 1, wherein the mounting members reversibly deflect in response to a force applied between the bonding pad and the two or more mounting members, the mounting members are symmetrically arranged relative to the cradle, such that the reversible deflection minimizes displacement of a reference point of the optical ferrule relative to a corresponding reference point of the substrate.

* * * * *